(12) United States Patent  
Durkee et al.

(10) Patent No.: US 10,459,142 B2  
(45) Date of Patent: *Oct. 29, 2019

(54) OPTICAL WAVEGUIDE BODIES AND LUMINAIRES UTILIZING SAME

(71) Applicant: Cree, Inc., Durham, NC (US)

(72) Inventors: John W. Durkee, Raleigh, NC (US); Kurt S. Wilcox, Libertyville, IL (US); Eric J. Tarsa, Goleta, CA (US)

(73) Assignee: IDEAL INDUSTRIES LIGHTING LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/481,206

(22) Filed: Apr. 6, 2017

(65) Prior Publication Data

US 2017/0212291 A1 Jul. 27, 2017

Related U.S. Application Data

(60) Continuation of application No. 14/991,581, filed on Jan. 8, 2016, now Pat. No. 9,625,636, which is a (Continued)

(51) Int. Cl.
*F21V 8/00* (2006.01)
*F21S 8/06* (2006.01)
(Continued)

(52) U.S. Cl.
CPC ............ *G02B 6/0021* (2013.01); *F21S 8/061* (2013.01); *F21V 21/005* (2013.01); *F21V 23/06* (2013.01);
(Continued)

(58) Field of Classification Search
CPC .. G02B 6/0013; G02B 6/0021; G02B 6/0031; G02B 6/0073
See application file for complete search history.

(56) References Cited

U.S. PATENT DOCUMENTS 6,193,383 B1 2/2001 Onikiri et al.
6,536,921 B1 * 3/2003 Simon ................. F21S 6/005
362/268
(Continued)

FOREIGN PATENT DOCUMENTS

JP H10173870 A 6/1998
JP 2001133779 A 5/2001
(Continued)

*Primary Examiner* — Daniel Petkovsek  
(74) *Attorney, Agent, or Firm* — Coats & Bennett, PLLC

(57) ABSTRACT

A luminaire comprises an optical element. The optical element comprises a coupling portion that comprises a coupling cavity that extends along a length of the optical element. The coupling cavity is configured to receive at least one light emitting diode. The optical element further comprises first and second sections extending away from the coupling portion of the optical element along the length of the coupling cavity. The first section comprises a first thickness closer to the coupling portion and a second thickness further from the coupling portion. The first thickness is greater than the second thickness. The second section comprises a third thickness closer to the coupling portion and a fourth thickness further from the coupling portion. The third thickness is greater than the fourth thickness. Light is extracted out of extraction features of opposing sides of at least one section.

11 Claims, 35 Drawing Sheets

Related U.S. Application Data division of application No. 14/577,730, filed on Dec. 19, 2014, now abandoned, and a continuation-in-part of application No. 14/015,801, filed on Aug. 30, 2013, now Pat. No. 9,291,320, and a continuation-in-part of application No. 13/842,251, filed on Mar. 15, 2013, now Pat. No. 9,519,095, and a continuation-in-part of application No. 13/839,949, filed on Mar. 15, 2013, now Pat. No. 9,581,751, and a continuation-in-part of application No. 13/841,074, filed on Mar. 15, 2013, now Pat. No. 9,625,638, and a continuation-in-part of application No. 13/841,622, filed on Mar. 15, 2013, and a continuation-in-part of application No. 13/840,563, filed on Mar. 15, 2013, and a continuation-in-part of application No. 13/938,877, filed on Jul. 10, 2013, now Pat. No. 9,389,367, and a continuation-in-part of application No. 14/101,099, filed on Dec. 9, 2013, now Pat. No. 9,411,086, and a continuation-in-part of application No. 14/101,129, filed on Dec. 9, 2013, now Pat. No. 10,234,616, and a continuation-in-part of application No. 14/101,051, filed on Dec. 9, 2013, now Pat. No. 9,366,396, and a continuation-in-part of application No. PCT/US2014/013931, filed on Jan. 30, 2014, and a continuation-in-part of application No. PCT/US2014/013937, filed on Jan. 30, 2014, and a continuation-in-part of application No. PCT/US2014/030017, filed on Mar. 15, 2014, and a continuation-in-part of application No. 14/292,778, filed on May 30, 2014, now Pat. No. 9,366,799, and a continuation-in-part of application No. 14/485,609, filed on Sep. 12, 2014, now Pat. No. 9,952,372, and a continuation-in-part of application No. 14/462,426, filed on Aug. 18, 2014, said application No. 14/991,581 is a continuation-in-part of application No. 14/462,391, filed on Aug. 18, 2014, now Pat. No. 9,513,424, and a continuation-in-part of application No. 14/472,035, filed on Aug. 28, 2014, now Pat. No. 9,645,303.

(60) Provisional application No. 61/922,017, filed on Dec. 30, 2013, provisional application No. 62/005,955, filed on May 30, 2014, provisional application No. 62/009,039, filed on Jun. 6, 2014.

(51) Int. Cl.

| | |
|---|---|
| *F21V 21/005* | (2006.01) |
| *F21V 23/06* | (2006.01) |
| *F21Y 101/00* | (2016.01) |
| *F21Y 103/10* | (2016.01) |
| *F21Y 115/10* | (2016.01) |
| *F21Y 103/33* | (2016.01) |
| *F21V 7/00* | (2006.01) |
| *F21V 17/10* | (2006.01) |
| *F21V 23/00* | (2015.01) |

(52) U.S. Cl.
CPC ......... *G02B 6/0035* (2013.01); *G02B 6/0046* (2013.01); *G02B 6/0063* (2013.01); *G02B 6/0078* (2013.01); *F21V 7/0008* (2013.01); *F21V 17/10* (2013.01); *F21V 23/001* (2013.01); *F21Y 2101/00* (2013.01); *F21Y 2103/10* (2016.08); *F21Y 2103/33* (2016.08); *F21Y 2115/10* (2016.08); *G02B 6/0031* (2013.01); *G02B 6/0036* (2013.01); *G02B 6/0048* (2013.01)

(56) References Cited

U.S. PATENT DOCUMENTS

| | | | |
|---|---|---|---|
| 6,598,998 B2 | 7/2003 | West et al. | |
| 6,802,628 B2 * | 10/2004 | Kuo | G02B 6/0021 362/224 |
| 7,791,683 B2 | 9/2010 | Larson et al. | |
| 8,434,913 B2 * | 5/2013 | Vissenberg | G02B 6/0021 362/311.06 |
| 8,496,355 B2 | 7/2013 | Kao et al. | |
| 8,702,281 B2 | 4/2014 | Okada et al. | |
| 8,833,996 B2 * | 9/2014 | Dau | G02B 6/0073 362/558 |
| 9,461,218 B2 | 10/2016 | Illek et al. | |
| 9,625,636 B2 * | 4/2017 | Durkee | G02B 6/0021 |
| 2004/0076010 A1 | 4/2004 | Kuo | |
| 2006/0076568 A1 | 4/2006 | Keller et al. | |
| 2010/0220497 A1 * | 9/2010 | Ngai | G02B 6/002 362/610 |
| 2011/0013420 A1 | 1/2011 | Coleman et al. | |
| 2011/0248287 A1 | 10/2011 | Yuan et al. | |
| 2011/0261570 A1 | 10/2011 | Okada et al. | |
| 2012/0020108 A1 | 1/2012 | Chang | |
| 2012/0113676 A1 | 5/2012 | Van Dijk et al. | |
| 2012/0140461 A1 | 6/2012 | Pickard | |
| 2012/0188774 A1 | 7/2012 | Okada | |

FOREIGN PATENT DOCUMENTS

| | | |
|---|---|---|
| JP | 3093080 U | 4/2003 |
| JP | 2009170205 A | 7/2009 |
| JP | 2009175702 A | 8/2009 |
| JP | 2011228185 A | 11/2011 |
| JP | 2012104476 A | 5/2012 |
| JP | 2015511758 A | 4/2015 |
| TW | 201024627 A | 7/2010 |
| WO | 2012073156 A1 | 6/2012 |

\* cited by examiner

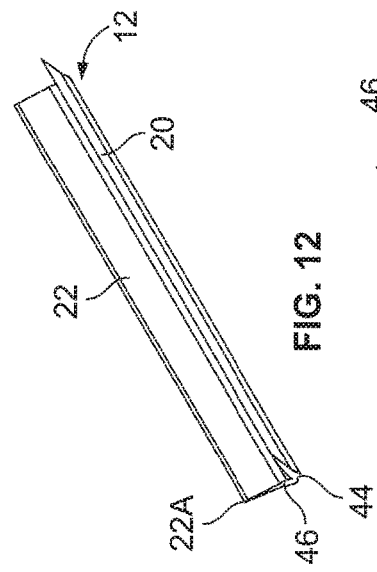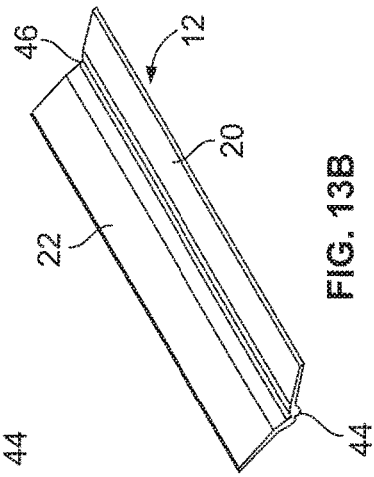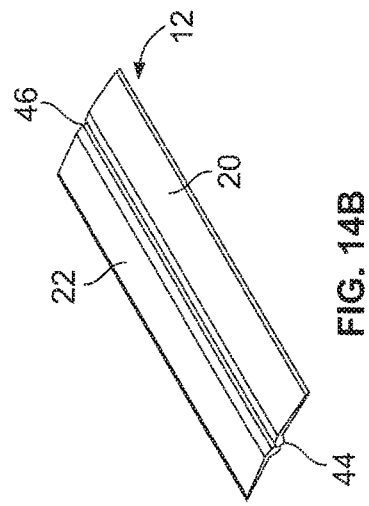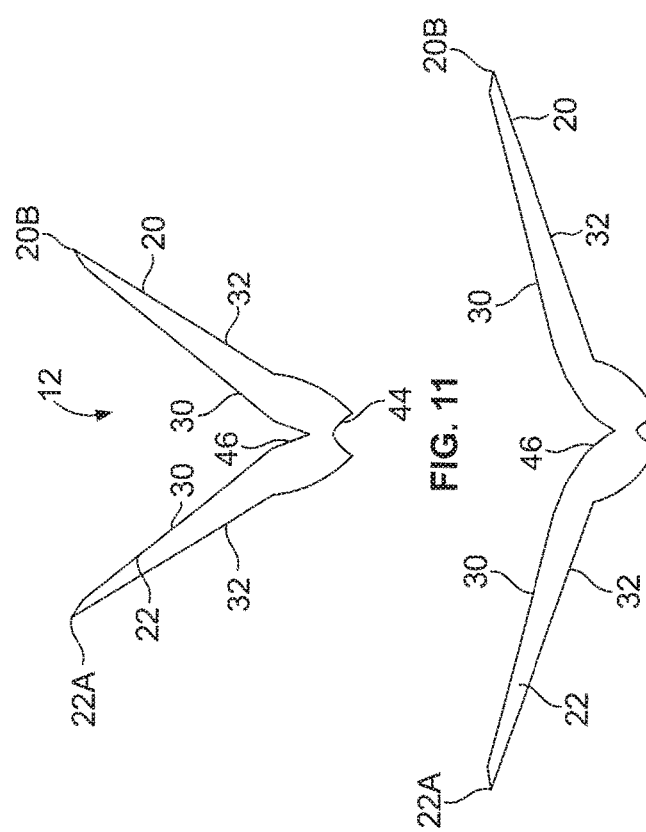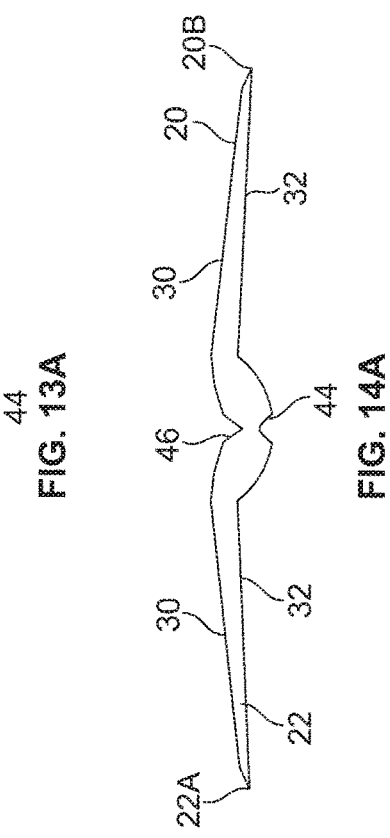

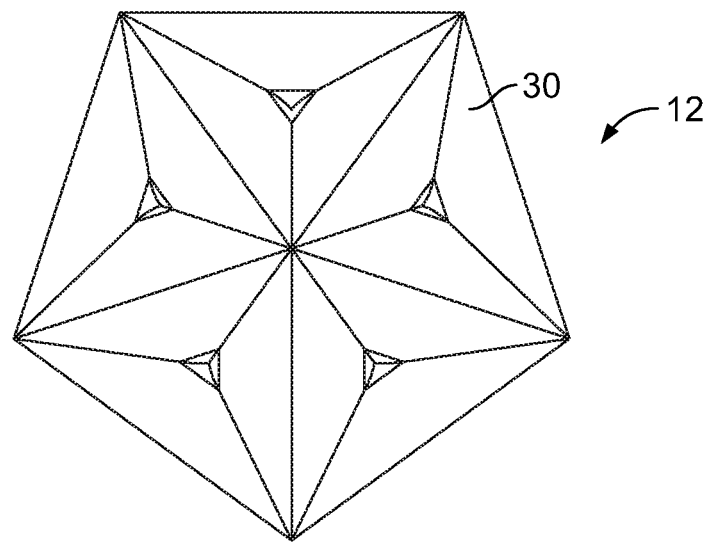
FIG. 25A
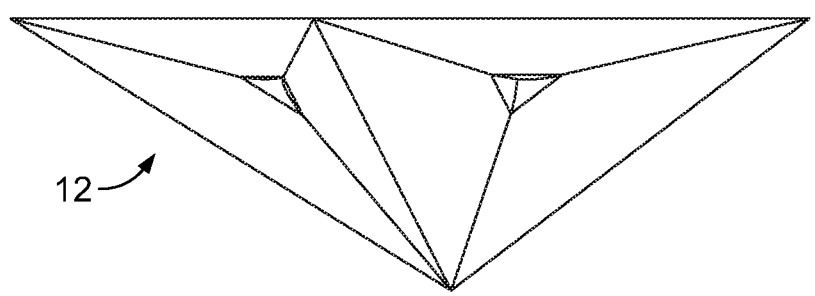
FIG. 25B
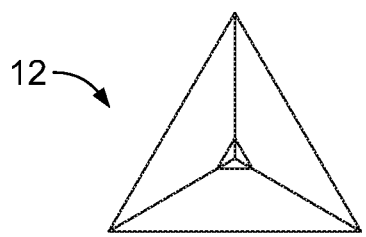
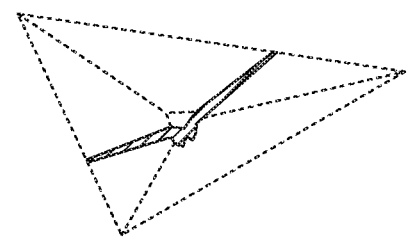
FIG. 25C  FIG. 25D

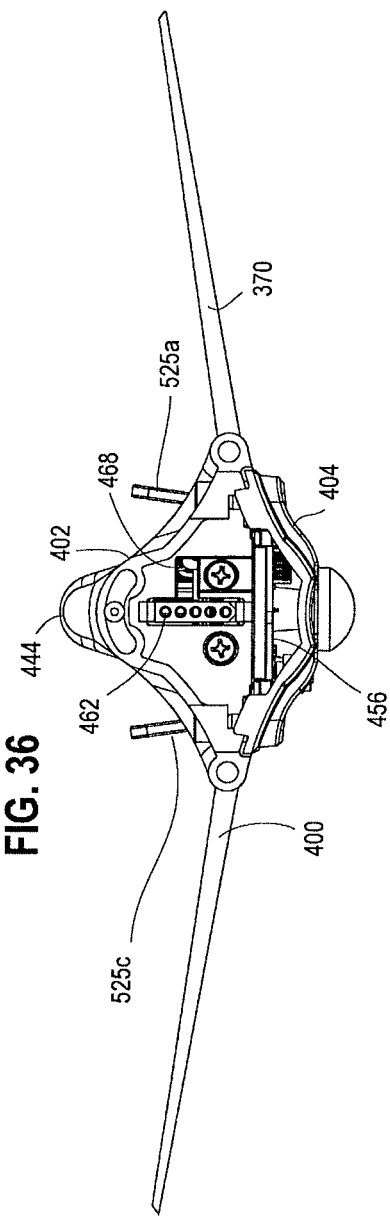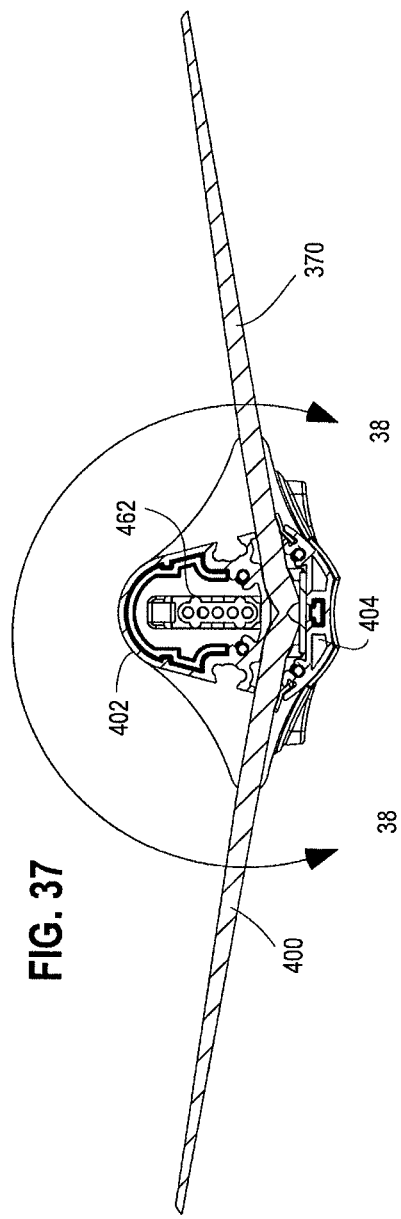

OPTICAL WAVEGUIDE BODIES AND LUMINAIRES UTILIZING SAME

CROSS REFERENCE TO RELATED APPLICATIONS

The present application is a continuation application of U.S. patent application Ser. No. 14/991,581, filed Jan. 8, 2016, entitled "Optical Waveguide Bodies and Luminaires Utilizing Same", now patented as U.S. Pat. No. 9,625,636, which is a divisional application of U.S. patent application Ser. No. 14/577,730, filed Dec. 19, 2014, entitled "Optical Waveguide Bodies and Luminaires Utilizing Same", now abandoned. Said U.S. patent application Ser. No. 14/991,581, filed Jan. 8, 2016, entitled "Optical Waveguide Bodies and Luminaires Utilizing Same" further comprises a continuation-in-part of U.S. patent application Ser. No. 14/015,801, filed Aug. 30, 2013, entitled "Consolidated Troffer", now patented as U.S. Pat. No. 9,291,320, and further comprises a continuation-in-part of U.S. patent application Ser. No. 13/842,521, filed Mar. 15, 2013, entitled "Optical Waveguides", now patented as U.S. Pat. No. 9,519,095, and further comprises a continuation-in-part of U.S. patent application Ser. No. 13/839,949, filed Mar. 15, 2013, entitled "Optical Waveguide and Lamp Including Same", now patented as U.S. Pat. No. 9,581,751, and further comprises a continuation-in-part of U.S. patent application Ser. No. 13/841,074, filed Mar. 15, 2013, entitled "Optical Waveguide Body", now patented as U.S. Pat. No. 9,625,638, and further comprises a continuation-in-part of U.S. application Ser. No. 13/841,622, filed Mar. 15, 2013, entitled "Shaped Optical Waveguide Bodies", now abandoned, and further comprises a continuation-in-part of U.S. patent application Ser. No. 13/840,563, filed Mar. 15, 2013, entitled "Optical Waveguide and Luminaire Incorporating Same", and further comprises a continuation-in-part of U.S. patent application Ser. No. 13/938,877, filed Jul. 10, 2013, entitled "Optical Waveguide and Luminaire Incorporating Same", now patented as U.S. Pat. No. 9,389,367, and further comprises a continuation-in-part of U.S. patent application Ser. No. 14/101,099, filed Dec. 9, 2013, entitled "Optical Waveguide Assembly and Light Engine Including Same", now patented as U.S. Pat. No. 9,411,086, and further comprises a continuation-in-part of U.S. patent application Ser. No. 14/101,129, filed Dec. 9, 2013, entitled "Simplified Low Profile Module With Light Guide For Pendant, Surface Mount, Wall Mount and Stand Alone Luminaires", and further comprises a continuation-in-part of U.S. patent application Ser. No. 14/101,051, filed Dec. 9, 2013, entitled "Optical Waveguide and Lamp Including Same", now patented as U.S. Pat. No. 9,366,396, and further comprises a continuation-in-part of International Application No. PCT/US14/13931, filed Jan. 30, 2014, entitled "Optical Waveguides and Luminaires Incorporating Same", now expired, and further comprises a continuation-in-part of International Application No. PCTIUS14/13937, filed Jan. 30, 2014, entitled "Optical Waveguide Bodies and Luminaires Utilizing Same", now expired, and further comprises a continuation-in-part of International Application No. PCTIUS14/30017, filed Mar. 15, 2014, entitled "Optical Waveguide Body", now expired, and further comprises a continuation-in-part of U.S. patent application Ser. No. 14/292,778, filed May 30, 2014, entitled "Optical Waveguide Bodies and Luminaires Utilizing Same", now patented as U.S. Pat. No. 9,366,799, and further comprises a continuation-in-part of U.S. patent application Ser. No. 14/485,609, filed Sep. 12, 2014, entitled "Luminaire Utilizing Waveguide", now patented as U.S. Pat. No. 9,952,372, and further comprises a continuation-in-part of U.S. patent application Ser. No. 14/462,426, filed Aug. 18, 2014, entitled "Outdoor and/or Enclosed LED Luminaire for General Illumination Applications, Such as Parking Lots and Structures", which claims the benefit of U.S. Provisional Patent Application No. 61/922,017, filed Dec. 30, 2013, entitled "Optical Waveguide Bodies and Luminaires Utilizing Same", now expired, and further claims the benefit of U.S. Provisional Patent Application No. 62/005,955, filed May 30, 2014, entitled "Parking Structure LED Light", now expired, and further claims the benefit of U.S. Provisional Patent Application No. 62/009,039, filed Jun. 6, 2014, entitled "Parking Structure LED Light", now expired. Said U.S. patent application Ser. No. 14/991,581, filed Jan. 8, 2016, entitled "Optical Waveguide Bodies and Luminaires Utilizing Same", now patented as U.S. Pat. No. 9,625,636, further comprises a continuation-in-part of U.S. patent application Ser. No. 14/462,391, filed Aug. 18, 2014, entitled "Optical Components for Luminaire", now patented as U.S. Pat. No. 9,513,424, and further comprises a continuation-in-part of U.S. patent application Ser. No. 14/472,035, filed Aug. 28, 2014, entitled "Luminaires Utilizing Edge Coupling", now patented as U.S. Pat. No. 9,645,303. All of the above-mentioned applications are owned by the assignee of the present application. The disclosures of all of the above-mentioned applications are incorporated by reference herein.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to luminaires, and more particularly to luminaires utilizing optical waveguides for general lighting.

BACKGROUND

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and are dependent on the waveguide geometry and material. The extraction element(s) determine how light is removed by controlling where and in what direction the light exits the waveguide.

When designing coupling component(s), the primary considerations are: maximizing the efficiency of light transfer from the source into the waveguide; controlling the location of light injected into the waveguide; and controlling the angular distribution of the light in the coupling optic. Light may be coupled into the waveguide through an air gap and a coupling cavity defined by surfaces located at an edge and/or interior portions of the waveguide. Such surfaces comprise an interface between the relatively low index of refraction of air and the relatively high index of refraction of the waveguide material. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s).

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light-emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

Low-profile LED-based luminaires have recently been developed (e.g., General Electric's ET series panel troffers) that utilize a string of LED components directed into the edge of a waveguiding element (an "edge-lit" approach). However, such luminaires typically suffer from low efficiency due to losses inherent in coupling light emitted from a predominantly lambertian emitting source such as a LED component into the narrow edge of a waveguide plane.

SUMMARY

According to one aspect, a luminaire comprises an optical element. The optical element comprises a coupling portion that comprises a coupling cavity that extends along a length of the optical element. The coupling cavity is configured to receive at least one light emitting diode. The optical element further comprises first and second sections extending away from the coupling portion of the optical element along the length of the coupling cavity. The first section comprises a first thickness closer to the coupling portion and a second thickness further from the coupling portion. The first thickness is greater than the second thickness. The second section comprises a third thickness closer to the coupling portion and a fourth thickness further from the coupling portion. The third thickness is greater than the fourth thickness. Light is extracted out of extraction features of opposing sides of at least one section.

According to another aspect, a waveguide body comprises a length from a first end to a second end along a longitudinal axis. The waveguide body further comprises a coupling portion that comprises first and second coupling surfaces defining at least in part an elongate coupling cavity. The waveguide body further comprises first and second opposed sections extending along the length of the waveguide body. Said first and second opposed sections further comprise respective first and second lower surfaces disposed at different first and second side section angles with respect to a first axis lying in a plane normal to the longitudinal axis. The first axis bisects the coupling portion. The first section comprises a first thickness proximal the coupling portion and a second thickness smaller than the first thickness and disposed distal from the coupling portion. The second section comprises a third thickness proximal the coupling portion and a fourth thickness smaller than the third thickness and disposed distal from the coupling portion.

Other aspects and advantages will become apparent upon consideration of the following detailed description and the attached drawings wherein like numerals designate like structures throughout the specification.

BRIEF DESCRIPTION OF THE DRAWINGS

FIG. 11 is an end elevational view of a waveguide body useable in a still further embodiment of a luminaire.

FIG. 12 is an isometric view of the waveguide body of FIG. 11.

FIG. 13A is an end elevational view of another waveguide body usable in yet another embodiment a disclosed luminaire.

FIG. 13B is an isometric view of the waveguide body of FIG. 13A.

FIG. 14A is an end elevational view of a waveguide body usable in a still further embodiment of a luminaire.

FIG. 14B is an isometric view of the waveguide body of FIG. 14A.

FIG. 25A is a lower elevation view of yet another embodiment of a disclosed luminaire.

FIG. 25B is a side elevation of the luminaire shown in FIG. 25A.

FIG. 25C is a side elevation of one of the components of the luminaire shown in FIG. 25A.

FIG. 25D is an isometric view showing in dash lines the outline of one of the components of the luminaire shown in FIG. 25A and in solid line the cross section of the component.

FIG. 36 is a left end view of the luminaire section of FIG. 34 with an end cap omitted therefrom.

FIG. 37 is a sectional view taken generally along the lines 37-37 of FIG. 34.

DETAILED DESCRIPTION

The following examples further illustrate the invention but, of course, should not be construed as in any way limiting its scope.

Figure 7:
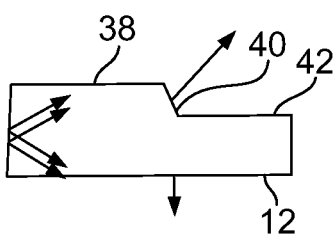
FIG. 7 is a diagram showing light rays traveling through a waveguide body having facets disposed at a first angle.
Figure 8:
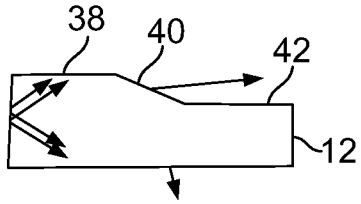
FIG. 8 is a diagram showing light rays traveling through a waveguide having facets disposed a second angle shallower than the facets of FIG. 7.

In general, the curvature and/or other shape of a waveguide body and/or the shape, size, and/or spacing of extraction features determine the particular light extraction distribution. All of these options affect the visual uniformity from one end of the waveguide to another. For example, a waveguide body having smooth surfaces may emit light at curved portions thereof. The sharper the curve is the more light is extracted. The extraction of light along a curve also depends on the thickness of the waveguide body. Light can travel through tight curves of a thin waveguide body without reaching the critical angle, whereas light that travels through a thick waveguide body is more likely to strike the surface at an angle that allows the light to escape. According to well-known TIR principles, the light rays of the groups 91a, 91b continue to travel through the arm portions 62, 64, respectively, until such rays strike an index interface surface at a particular angle less than an angle measured with respect to a line normal to the surface point at which the light rays are incident (or, equivalently, until the light rays exceed an angle measured with respect to a line tangent to the surface point at which the light ray is incident) and the light rays escape, as seen in FIGS. 7 and 8.

Tapering a waveguide body causes light to reflect internally along the length of the waveguide body while increasing the angle of incidence. Eventually, this light strikes one side at an angle that allows the light to escape. The opposite example, i.e., a gradually thickening waveguide body over the length thereof, causes light to collimate along the length with fewer and fewer interactions with the waveguide body surfaces. These reactions can be used to extract and control light within the waveguide. When combined with dedicated extraction features, tapering allows one to change the incident angular distribution across an array of features. This, in turn, controls how much, and in what direction light is extracted. Thus, a select combination of curves, tapered surfaces, and extraction features can achieve a desired illumination and appearance.

Still further, the waveguide bodies contemplated herein are made of any suitable optically transmissive material, such as an acrylic material, a silicone, a polycarbonate, a glass material, a cyclic olefin copolymer, air, or other suitable material(s), or combinations thereof to achieve a desired effect and/or appearance.

According to one aspect, a waveguide directs light into at least one up to an infinite number of beams or ray groups, wherein the rays of each group travel through the waveguide within a range of angles relative to one another. Each range may be narrow or broad within the TIR limits of the waveguide material.

According to another aspect, a waveguide arranges light into a plurality of groups that bounce at least once inside the waveguide by total internal reflection ("TIR") off one or more surfaces of the waveguide. Each group comprises a plurality of light rays that travel at angles that are disposed within a narrow or broad range of angles relative to one another.

In any embodiment, the range may be so narrow that the light rays of ray group may be considered to be fully collimated, or nearly so, or the range may be so broad that the light rays of a ray group may be considered to be anti-collimated, or nearly so. Controlling the ray angles in this manner can lead to increased light control, reduced waveguide size and weight, and reduced luminaire costs.

Figure 1:
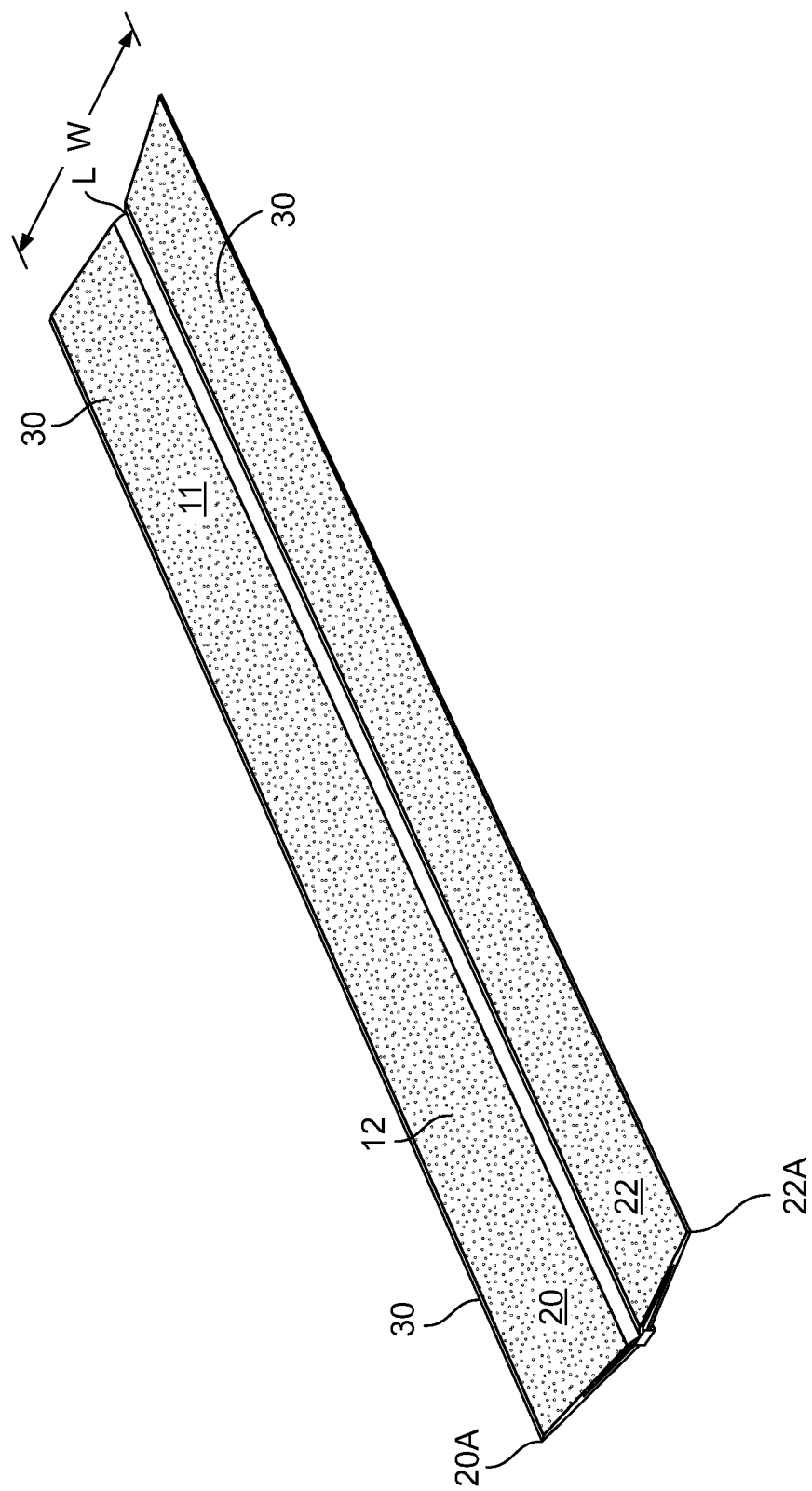
FIG. 1 is an isometric view showing an embodiment of a disclosed luminaire.
Figure 2:
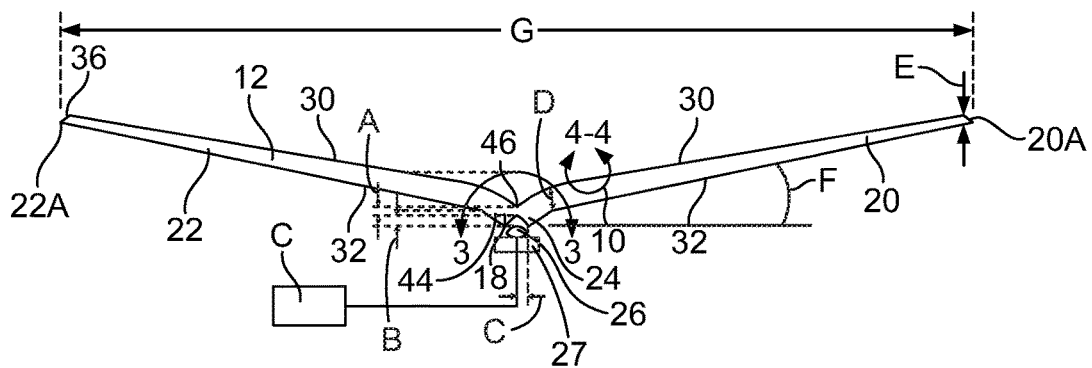
FIG. 2 is a combined end elevation view and block diagram of the embodiment of FIG. 1.
Figure 3:
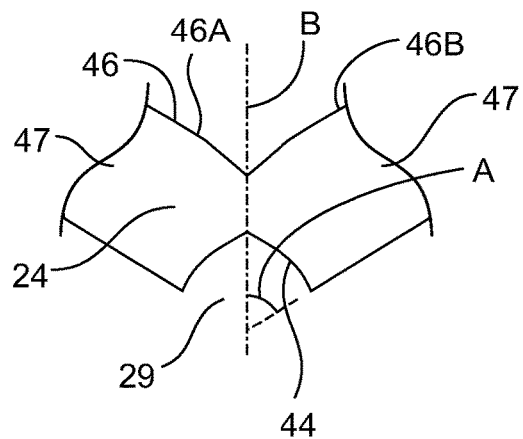
FIG. 3 is an enlarged, fragmentary side elevational view of the central section as referenced by the view lines 3-3 of FIG. 2.

FIGS. 1-3 show a luminaire 10 comprising a waveguide having a waveguide body 12 including a central section 18 and first and second separate side sections 20, 22 extending away from the central section 18 along first and second directions, respectively, and terminating at first and second outer ends 20A, 22A, respectively (FIG. 2). The side sections 20, 22 in the illustrated embodiment are preferably mirror images of one another. The central section 18 includes a coupling portion 24, and a light source 25 in the form of one or more LED element(s) 26 are disposed adjacent the coupling portion 24, as shown in FIG. 2, and the light source 25 is adapted to produce light that is directed into the waveguide body 12 via the coupling portion 24. A power circuit C (FIG. 2) provides power to the light source 25, and the waveguide body 12 includes a plurality of light extraction features 14 (FIGS. 4, 4B, 4C, 4D, 4E, and 4G show various embodiments of such features 14) that extract light out of the side sections 20, 22, for example as shown in FIGS. 7 and 8.

Figure 2A:
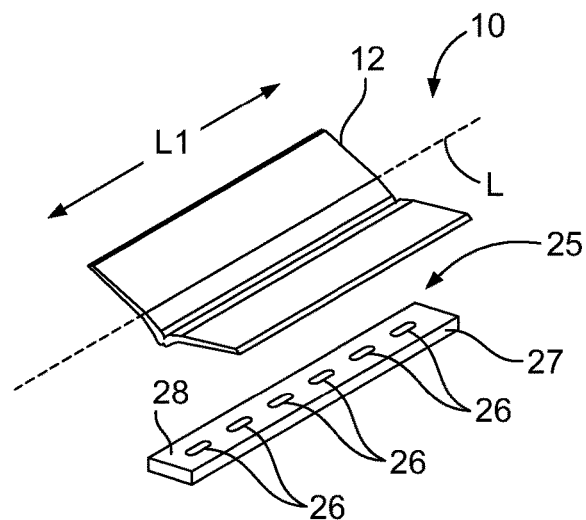
FIG. 2A is an exploded isometric view of the luminaire of FIGS. 1 and 2.

More specifically, as seen in FIG. 2A, the luminaire 10 includes a base element in the form of a substrate 27 having a base surface 28. If desired, the base surface 28 may be covered or coated by a reflective material, which may be a white material or a material that exhibits specular reflective characteristics. LED elements 26 are mounted on the base surface 28. The substrate 27 is secured in fixed relation to the waveguide body 12 in any suitable fashion such that the LED elements are preferably equally spaced along a longitudinal axis L (FIG. 2A) and further extend into a cavity 29 (FIG. 3) of the coupling portion 24. Each LED element 26 may be a single white LED or multiple white LEDs or each may comprise multiple LEDs either mounted separately or together on a single substrate or package including a phosphor-coated LED either alone or in combination with a color LED, such as a green LED, etc. In those cases where a soft white illumination is to be produced, each LED element 26 typically includes one or more blue shifted yellow LEDs and one or more red LEDs. Different color temperatures and appearances could be produced using other LED combinations, as is known in the art. In one embodiment, the light source comprises any LED, for example, an MT-G LED module incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, both as developed by Cree, Inc., the assignee of the present application. In any of the embodiments disclosed herein the LED(s) have a particular emission distribution, as necessary or desirable. For example, a side emitting LED disclosed in U.S. Pat. No. 8,541,795, the disclosure of which is incorporated by reference herein, may be utilized inside the waveguide body. More generally, any lambertian, symmetric, wide angle, preferential-sided, or asymmetric beam pattern LED(s) may be used as the light source. Still further, any of the LED arrangements and optical elements disclosed in co-pending U.S. patent application Ser. No. 14/101,147, filed Dec. 9, 2013, entitled "Luminaires Using Waveguide Bodies and Optical Elements" by Keller et al., incorporated by reference herein, may be used.

The power circuit C may be disposed on the substrate 27 or may be located remotely, or a portion of the power circuit C may be disposed on the substrate and the remainder of the power circuit C may be remotely located. In any event, the power circuit C is designed to operate the light source 25 with AC or DC power in a desired fashion to produce light of a desired intensity and appearance. If necessary or desirable, a heat exchanger (not shown) is arranged to dissipate heat and eliminate thermal crosstalk between the LEDs and the power circuit C. Preferably, the light source 25 develops light appropriate for general illumination purposes including light that may be generated in a down light, a light that produces a wall washing effect, a task light, a troffer, or the like. The power circuit C may include a buck regulator, a boost regulator, a buck-boost regulator, a SEPIC power supply, or the like, and is used in any of the embodiments disclosed herein and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al. incorporated by reference herein. The circuit C may further be used with light control circuitry LC that controls color temperature of any of the embodiments disclosed herein in accordance with user input such as disclosed in U.S. patent application Ser. No. 14/292,286, filed May 30, 2014, entitled "Lighting Fixture Providing Variable CCT" by Pope et al. incorporated by reference herein.

Figure 27A:
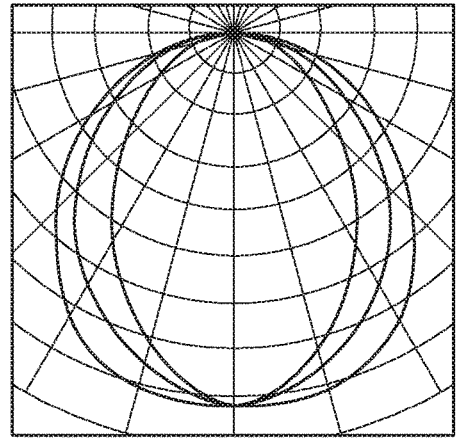
FIG. 27A is a graph illustrating an alternative desired light distribution emitted from the luminaire of FIG. 27.
Figure 27:
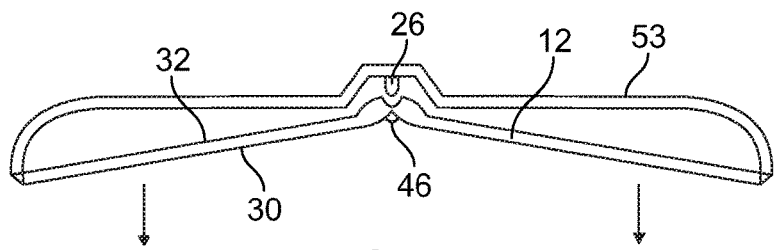
FIG. 27 is a side elevation view of an embodiment of a luminaire disclosed in the application and a reflector opposite one side of the luminaire.

In the embodiment of FIGS. 1-3 each of the first and the second side sections 20, 22 has an upper and a lower surface 30, 32 and includes a first end 20B, 22B proximal to the coupling portion 24 and a second end 20A, 22A, respectively, distal to the coupling portion 24. The first end 20B, 22B has a first thickness $T_1$, the second end 20A, 22A has a second thickness $T_2$, and the first thickness $T_1$ is greater than the second thickness $T_2$, and hence, the side sections 20, 22 are tapered. In a particular embodiment, for example, the first thickness $T_1$ is no greater than about 6 millimeters and the second thickness is no less than about 2 millimeters. In an embodiment, a center portion of each of the first and the second side sections 20, 22 also has a thickness equal to the second end 20A, 22A in that, for example, it is no less than about 2 millimeters. It should be noted that the minimum thickness is only limited by structural strength considerations, while maximum thickness is currently only limited by manufacturing considerations. In an embodiment, the ratio of the maximum to minimum thickness of the waveguide body is 10:1 or less. In a more particular version of the embodiment, the ratio is about approximately 3:1. In a particular embodiment, as shown in FIG. 27, a reflector 53 may be placed above the upper surface 30 of the waveguide 12. If desired, the reflector 53 can be replaced by a specular or reflective coating disposed on the surface 30. (In the embodiment of FIG. 27, the surface 32 is disposed above the surface 30, opposite to previous illustrated embodiments.) FIG. 27A illustrates an example light distribution of the embodiment of FIG. 27, where the concentric circles mark the magnitude of intensity (candelas: lumens/steradian), and the lines extending radially from the center mark the angle of the exiting light with 0° pointing straight down, 90° to the right and 180° straight up. Other desired light distributions may be realized.

Figure 5A:
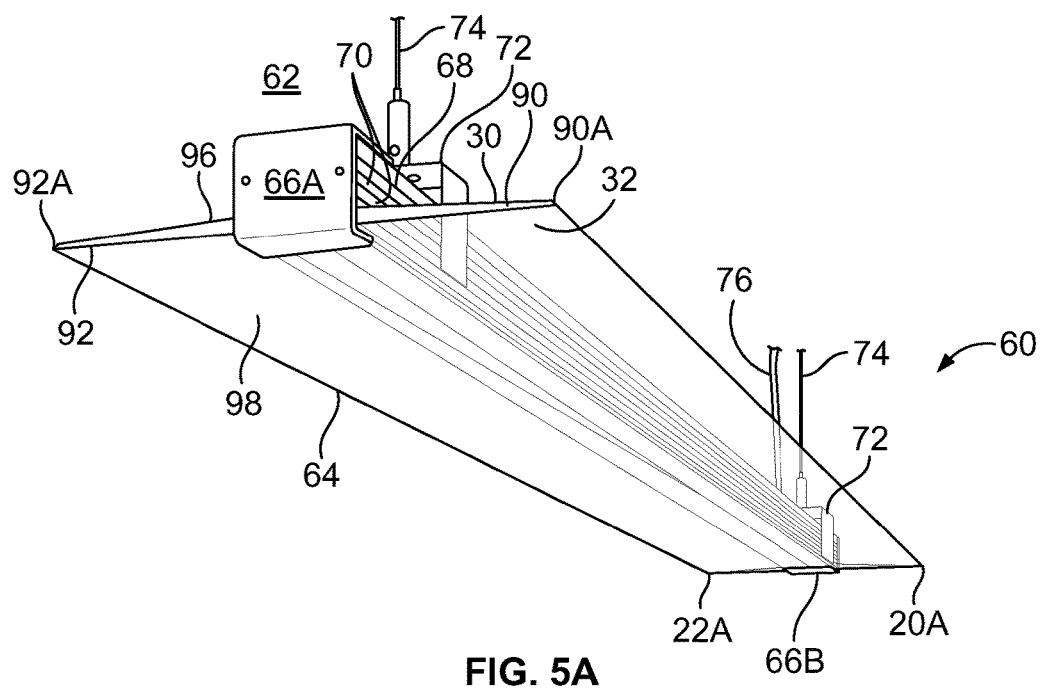
FIG. 5A is a perspective of a further embodiment of a luminaire.
Figure 5B:
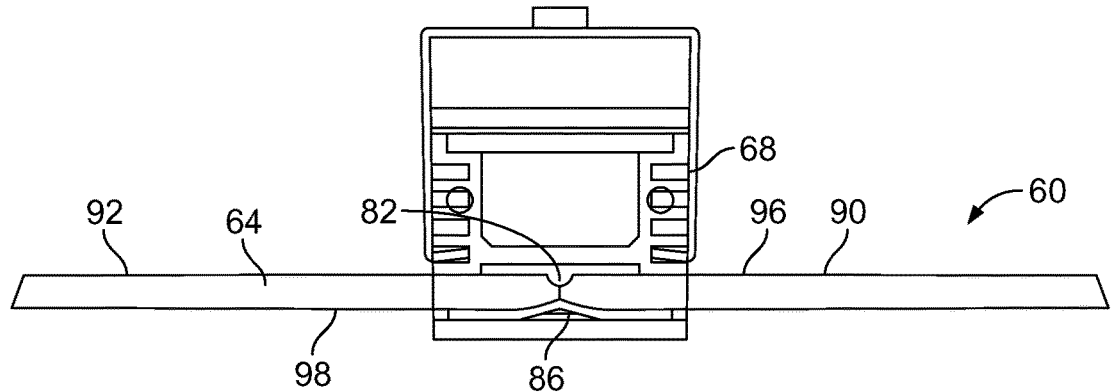
FIG. 5B is an end elevational view of a luminaire that is a modified version of that shown in FIG. 5A with an end cap removed.

In still another embodiment, a flat waveguide body 12 is used in which the first thickness $T_1$ is equal to the second thickness $T_2$, as shown in FIG. 5B.

Figure 4:
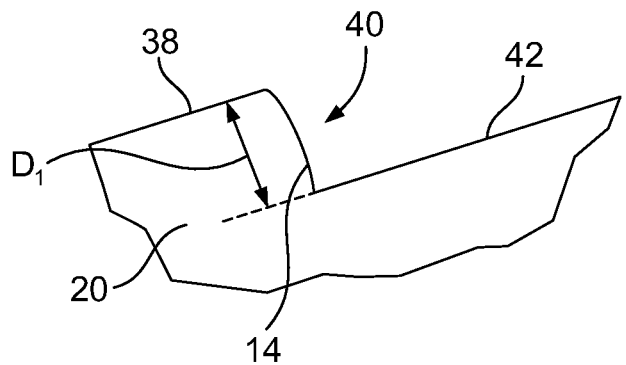
FIG. 4 is an enlarged, fragmentary side elevational view of an extraction feature as referenced by the view line 4-4 of FIG. 2.

Also in the illustrated embodiment of FIGS. 1-3, the coupling portion 24 curves upward away from the LED elements 26 toward one or both of the second ends 20A, 22A. The upper surface 30 of the first and second sections 20, 22 may be textured. Each textured surface 30 may comprise a plurality of light extraction features 14, one of which is shown in FIG. 4. In a more particular embodiment, each of the plurality of light extraction features 14 comprises an intermediate surface 40 that extends from a first surface 38 to a second surface 42. All or some of the intermediate surfaces 40 may be planar or curved, as shown in FIGS. 4, 4B, 4C, 4D, 4E, 4G, 4H, and 4I. In an embodiment, the angle of curvature of the intermediate surface 40 may range from 10° to 80°. In a more particular version of the embodiment, the angle of curvature is about approximately 30° to 60°. In still another version of the embodiment, the angle of curvature of the intermediate surface 40 is approximately 42.5° to 50°. The intermediate surfaces 40 may, but need not, have a constant radius of curvature. Furthermore, the edges 47 of the coupling portion 24 can be of any shape including, but not limited to, planar curved, angled, tapered, etc.

Also preferably, each first surface 38 is displaced from an associated adjacent second surface 42 by a particular distance D1, as shown in FIG. 4, wherein the distances $D_1$ are constant or vary along the length and width of each surface 30. The disposition of the center of the radius of curvature, the magnitude of the radius of curvature, and the arcuate extent of each intermediate surface 40 affect the distribution of light from the waveguide body 12. In another embodiment, as seen in FIGS. 7 and 8, the intermediate surfaces 40 are planar, and the intermediate surfaces 40 are all parallel to one another, although the surfaces 40 need not all be planar or parallel. In an embodiment, the perpendicular distance between the first surface 38 and the adjacent second surface 42 (i.e., the length of a line extending from and normal to the surface 38 to an imaginary projection of the plane 42 below the surface 38) is preferably less than 100 microns, and more preferably between about 20 and about 100 microns. In another embodiment, the intermediate surfaces 40 are parallel to one another and are disposed at non-zero angles with respect to associated first and second surfaces 38, 40. The angle between each intermediate surface 40 and a line tangent to an adjacent associated surface 38 or 42 where the surface 38 or 42 meets the surface 40 may be relatively steep (for example, as seen in FIG. 7) or may be relatively shallow (e.g., as seen in FIG. 8). Thus, for instance, the angle between each intermediate surface 40 and a line tangent to an adjacent associated surface 38 where the surface 38 meets the surface 40 may be in a range between about 5 degrees and 90 degrees, and more particularly, may be between about 40 degrees and about 60 degrees, and, most preferably, about 50 degrees. This angle (or any other related angle, such as the angle between the intermediate surface 40 and a line tangent to an adjacent associated surface 42 where the surface 42 meets the surface 40) and the size of each intermediate surface 40 affect the output distribution of light from the waveguide body 12.

It should also be noted that the extraction features may be of differing size, shape, and/or spacing over the surface(s) of the waveguide body 12 so that an asymmetric emitted light distribution is obtained. For example, the extraction features may include a combined notch and step extraction that leads to a tapered edge, as shown in FIGS. 22A-22D. The extraction features shown in FIG. 22D may have dimensions noted in the following table, although such dimensions are exemplary only and not limiting.

TABLE 1

Figure 22A:
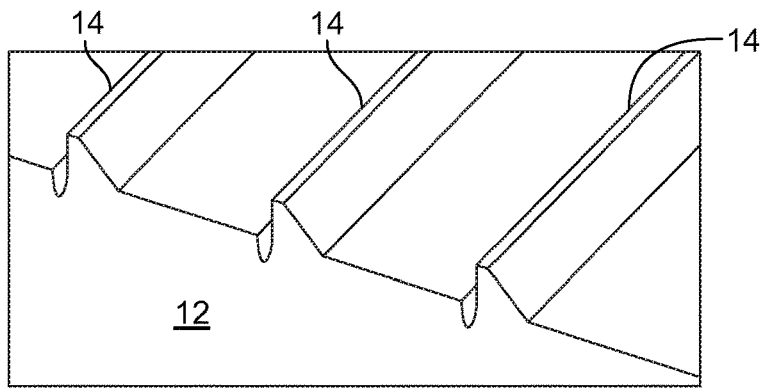
FIG. 22A is a fragmentary isometric of an embodiment of extraction features used in conjunction with the waveguide disclosed in the application.
Figure 22B:
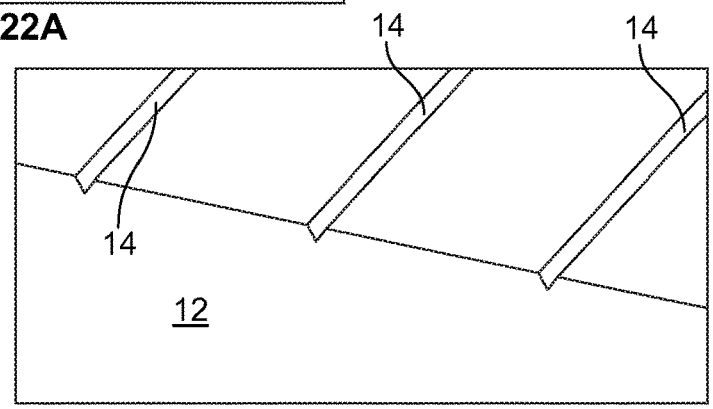
FIG. 22B is a fragmentary isometric of a second embodiment of extraction features used in conjunction with the waveguide disclosed in the application.
Figure 22C:
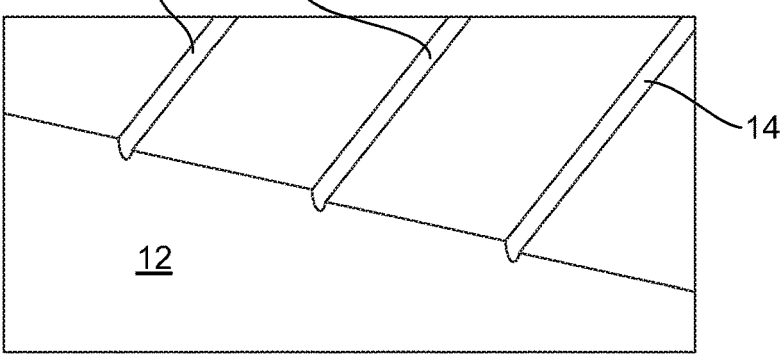
FIG. 22C is a fragmentary isometric of still another embodiment of extraction features used in conjunction with the waveguide disclosed in the application.
Figure 22D:
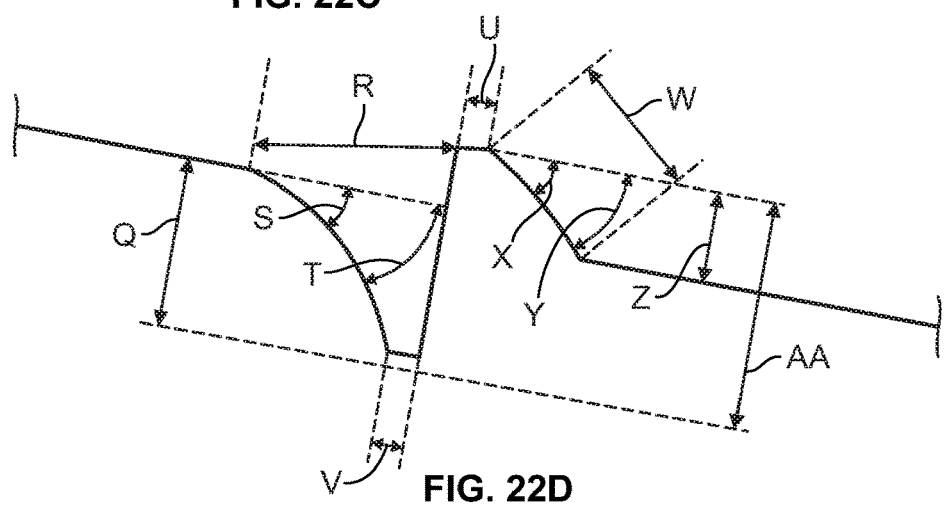
FIG. 22D is an enlarged, fragmentary, cross sectional view of a further embodiment of extraction features used in conjunction with the waveguide disclosed in the application.
Figure 23A:
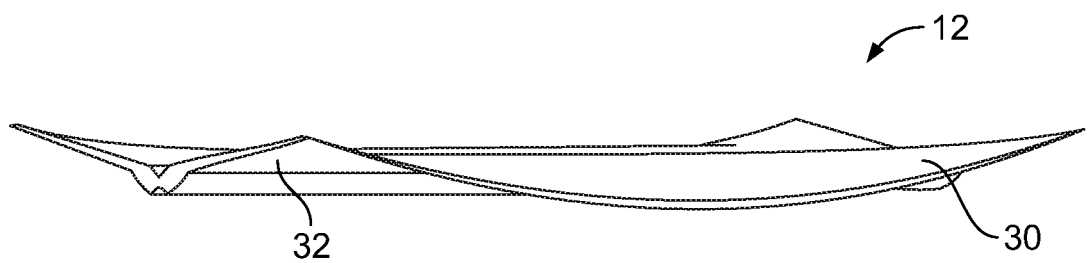
FIG. 23A is an isometric view of yet another waveguide body usable in a further embodiment of a luminaire.
Figure 23B:
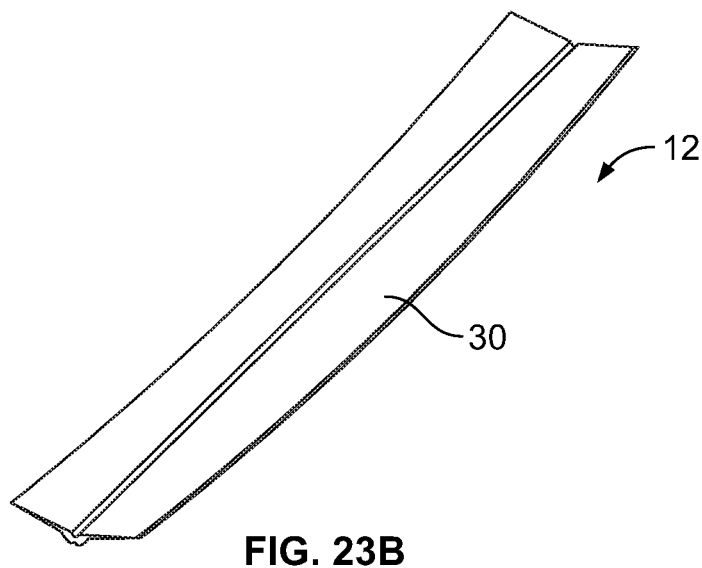
FIG. 23B is a second isometric view of the waveguide body shown in FIG. 23A.
Figure 23C:
FIG. 23C is a side elevation of the waveguide body shown in FIG. 23A.
Figure 24A:
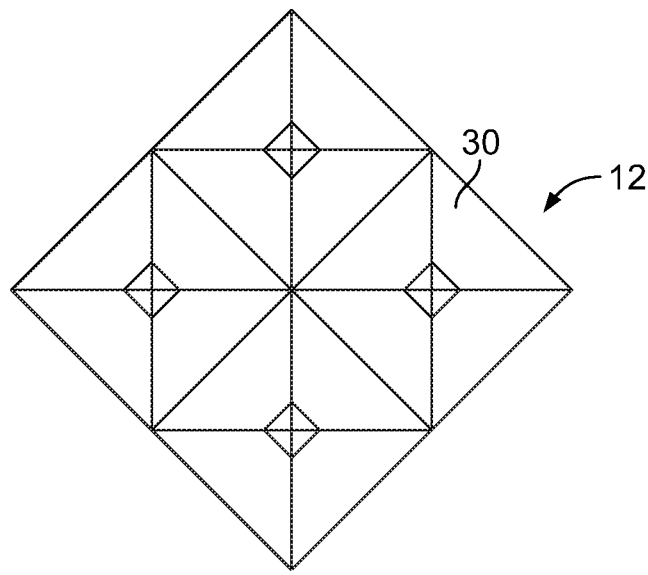
FIG. 24A is a lower elevation view of still another embodiment of a disclosed luminaire.
Figure 24B:
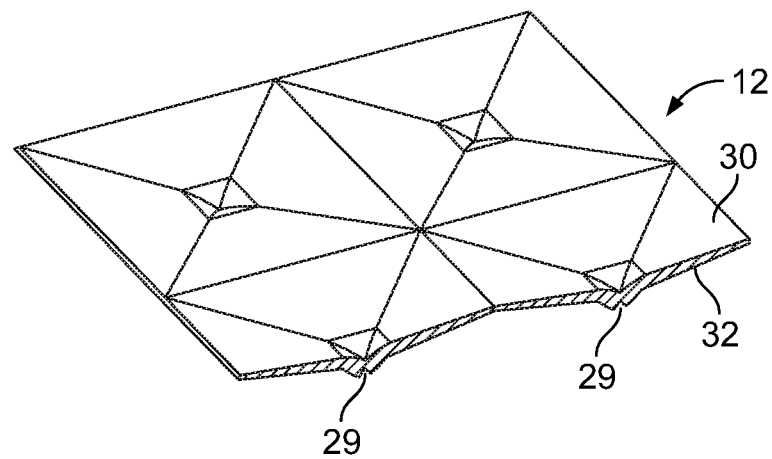
FIG. 24B is a sectional view of the luminaire shown in FIG. 24A.
Figure 24C:
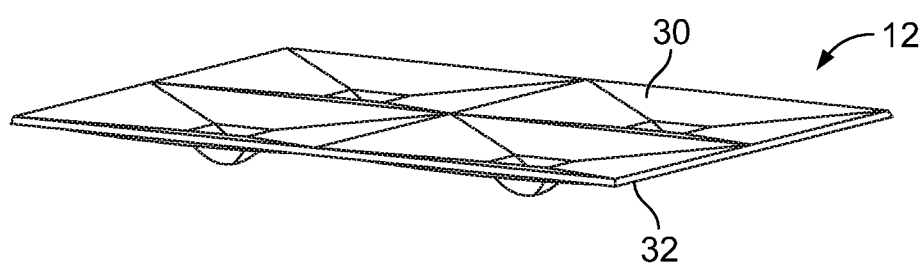
FIG. 24C is an isometric view of the luminaire shown in FIG. 24A.

| FIG. 22D | NOMINAL DIMENSION (Millimeters - unless otherwise specified) |
|---|---|
| Q | 0.100 |
| R | 0.134 |
| S | 20 degrees |
| T | 65 degrees |
| U | 0.020 |
| V | 0.020 |
| W | 0.092 |
| X | 30 degrees |
| Y | 50 degrees |
| Z | 0.060 |
| AA | 0.140 |

Additionally, as seen in co-pending U.S. patent application Ser. No. 14/101,086, filed Dec. 9, 2013, entitled "Optical Waveguides and Luminaires Incorporating Same" by Keller et al., the extraction features may comprise small indents or protrusions and a relatively large number of such extraction features may be disposed to the left of the coupling portion 24 and a relatively small number of such extraction features may be disposed to the right of the coupling portion 24. In such an embodiment, as should be evident, more light is extracted from the left side of the waveguide body 12 and relatively less light is extracted from the right side of the waveguide body 12.

In another embodiment, the lower surface 32 is textured. This texturing may be effected by a roughened surface that creates a diffusion effect, and/or by a plurality of extraction features 14. These extraction features 14 may be identical or similar to those described above.

Referring again to FIGS. 2 and 2A, in the illustrated embodiment, the waveguide body 12 has a length $L_1$ parallel to the longitudinal axis L, the waveguide body 12 further has a width W transverse to the length $L_1$. The width W can be as little about 3 inches or as wide as manufacturing allows. In one embodiment, the width W is about 12 inches and in another embodiment the width W is about 24 inches. The length $L_1$ can be as little as about 2 inches or as long as manufacturing allows. In an embodiment, the length $L_1$ is preferably at least about 12 inches, and, more preferably, at least about 48 inches. In the embodiment shown in FIG. 2, the waveguide disclosed herein may have the dimensions noted in the following table. It should be noted that the dimensions in the following table as exemplary only and not limiting:

TABLE 2

| FIG. 2 | NOMINAL DIMENSION (Millimeters - unless otherwise specified) |
|---|---|
| A | 2.0 |
| B | 3.2 |
| C | 3.0 |
| D | 7.6 |
| E | 2.0 |
| F | 10 degrees |
| G | 300 |

Figure 26:
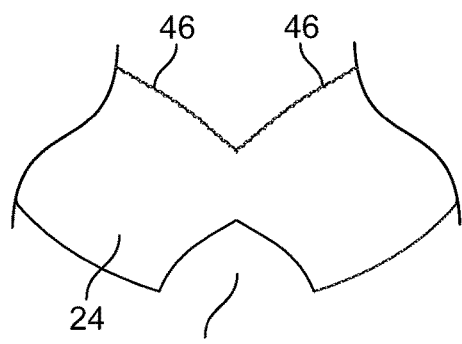
FIG. 26 is a side elevation view of an embodiment of a central section of a waveguide disclosed in the application showing a textured surface opposite the input surface.

As shown in FIG. 3, the coupling portion 24 has a concave first surface 44 defining the cavity 29 and a curved V-shaped second surface 46 disposed opposite the concave first surface 44. The concave surface 44 may be textured so as to allow for better color mixing of the light, as shown in FIG. 26. In one embodiment, the V-shaped second surface 46 is smooth and uncoated. In an alternative embodiment seen in FIG. 6, an optional layer of specular material 48 is disposed on the V-shaped second surface 46. In still another version of the embodiment seen in FIG. 6A, an optional specular reflective body 49 is located in the V-shaped convergence between the first and second sides 20, 22. The material 48 or the body 49 may be used in any of the embodiments discussed herein.

Figure 3A:
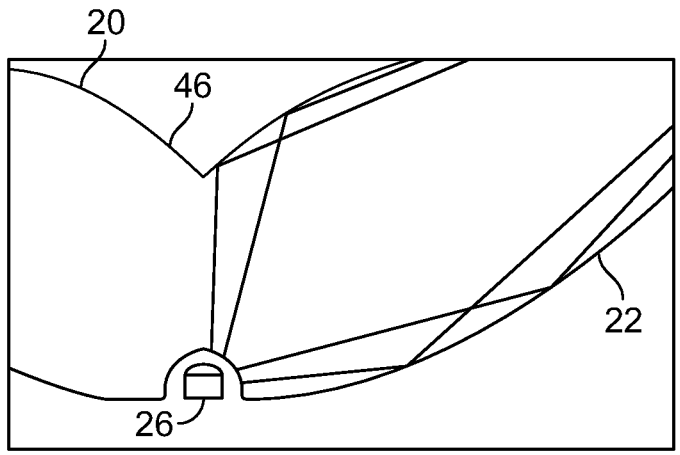
FIG. 3A is an enlarged, fragmentary side elevation of a central section.
Figure 3B:
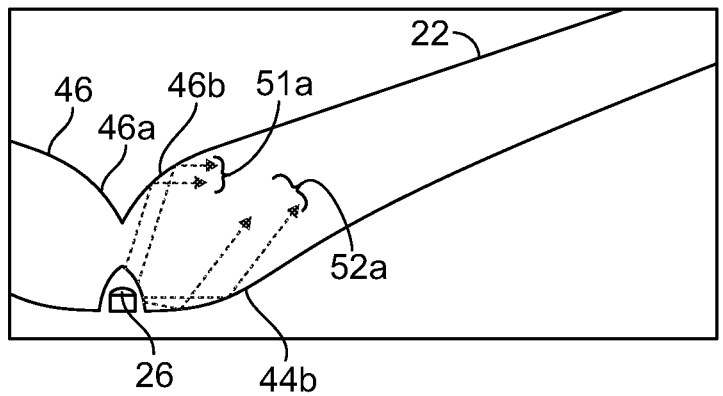
FIG. 3B is an enlarged, fragmentary side elevation of a luminaire that generates two independent light beams.
Figure 9:
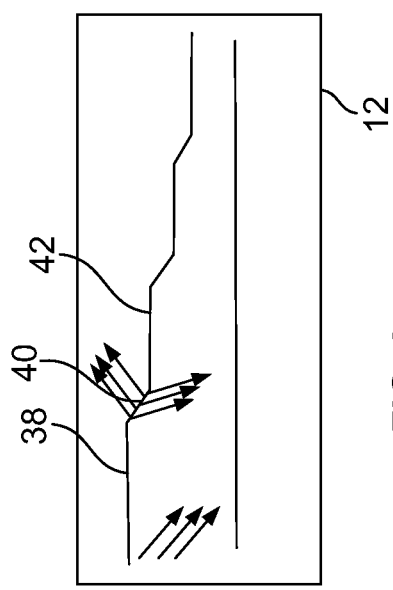
FIG. 9 is a diagram showing light rays traveling through the waveguide body in another embodiment of a disclosed luminaire.
Figure 10:
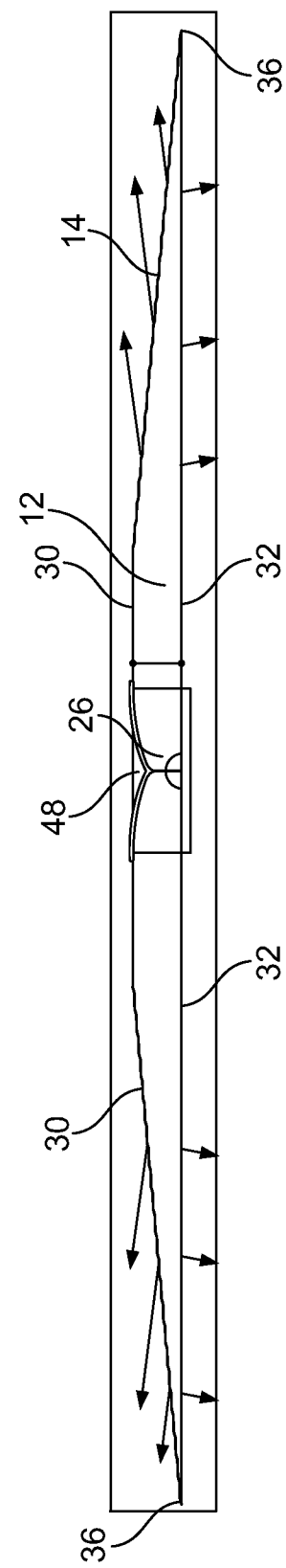
FIG. 10 is side elevational view of a waveguide used in yet another embodiment of a disclosed luminaire.

While redirecting rays of a light source 26 into one or more ray groups or beams each having a ray angle distribution range typically requires an optic substantially larger than the light source, such redirection can also be accomplished by using a thick waveguide 12, as shown in FIG. 3A. However, it may be preferable for costs reasons to undertake such light redirection using a relatively thin waveguide. For example, as seen in FIG. 3B, light developed by the light source 26 can be redirected into two independent sets of light rays. Each set of rays have a very narrow distribution range or may be substantially or fully collimated in order to achieve the desired light distribution out of the waveguide 12. Specifically, and with reference to FIG. 6, the primarily lambertian distribution of light developed by the LED element(s) 26 is incident on the walls defining the concave surface 44, and light incident on an upper surface 44a travels through the coupling portion 24 and strikes the curved V-shaped second surface 46. The surfaces 46a, 46b that make up the second surface 46 redirect the light by TIR (and/or specular reflection if the material 48 on the body 49 is present) into the sides 20, 22 as first sets of ray groups 51*a*, 51*b* that bounce due to total internal reflection between the upper and lower surfaces 30, 32 until such rays exceed the critical angle of the material of the waveguide body 12 and escape, as seen in FIGS. 7-9. Light incident on lower surfaces 44*b* of the concave surface 44 travels through the coupling portion 24 directly into the portions 20, 22 without striking the curved V-shaped second surface 46. In the embodiment of FIG. 3B the lower surfaces 44*b* are curved in a manner that causes the light passing through the surfaces 44*b* to be redirected second sets of ray groups 52*a*, 52*b*. This light also bounces between the upper and lower surfaces 30, 32 until such rays exceed the critical angle of the material of the waveguide body 12 and escape, as also seen in FIGS. 7-9. In the illustrated embodiment of FIG. 3B, the ray groups 51*a*, 51*b*, 52*a*, and 52*b* have narrow ray angle distributions (i.e., the ray groups are substantially or fully collimated). In some embodiments, the surfaces 46*a*, 46*b* may be parabolic in shape and centered on the light source 26. The extraction features 14 cause the light to exit the waveguide 12 in a controlled fashion such that light is directed out of the upper and lower surfaces 30, 32. Because the light rays are at least substantially collimated they experience minimal spreading as they propagate through the waveguide body 12. This results in highly controlled beams which can be either extracted in a collimated fashion, or spread into a wide distribution.

Figure 4A:
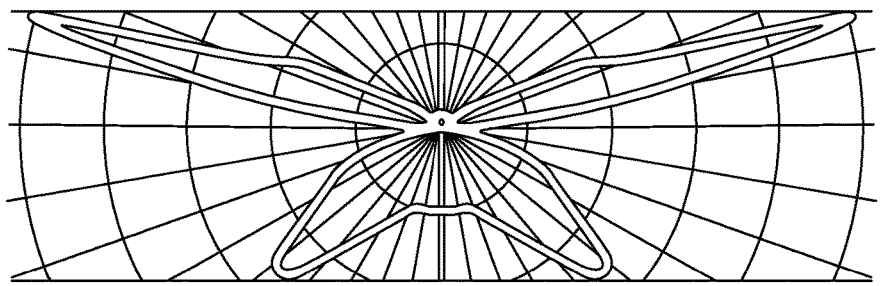
FIG. 4A is a graph illustrating a desired light distribution emitted from the luminaire of FIGS. 1 and 2.
Figure 4B:
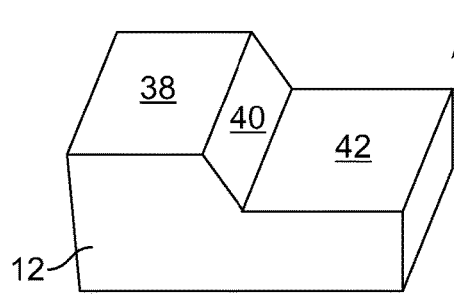
FIG. 4B is fragmentary view of an extraction feature used in one embodiment of the disclosure.
Figure 4C:
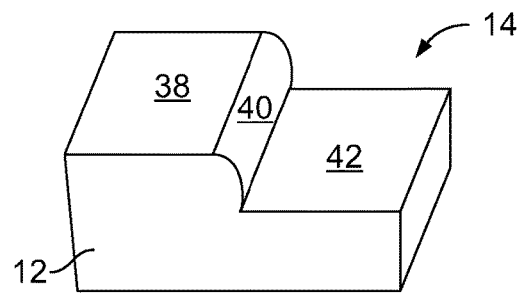
FIG. 4C is a fragmentary view of an extraction feature used in a second embodiment of the disclosure.
Figure 6:
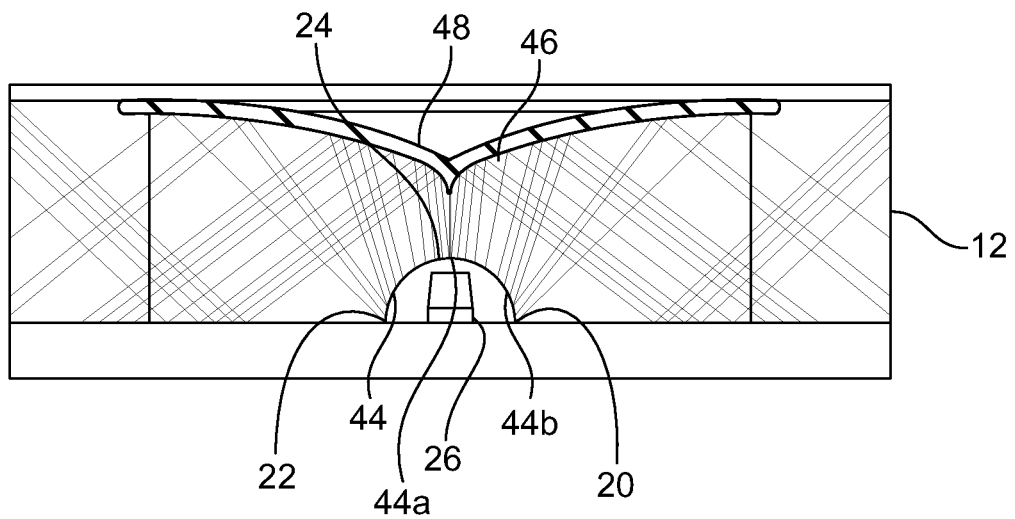
FIG. 6 is an enlarged, fragmentary cross sectional view of a central section of any of the waveguide bodies described herein showing a light source located proximal the central section and a mirrored top reflector opposite the light source.
Figure 6A:
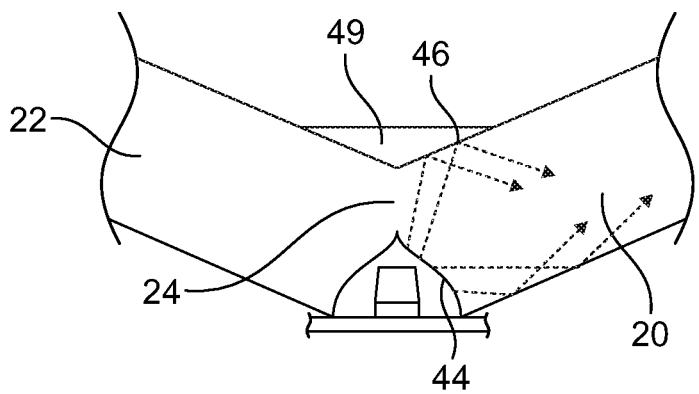
FIG. 6A is an enlarged, fragmentary end view of a central section showing a specular reflective body located in the V-shaped convergence between the first and second sides of the waveguide body.

Specifically, as shown in FIGS. 6-8, the collimated light rays repeatedly bounce through the guide 12 by total internal reflection until they strike an extraction feature 14 and are redirected into the waveguide 12 or escape into the space or room to be illuminated. The light that strikes the extraction features 14 and is reflected back into the waveguide body 12 may strike the opposing waveguide body surface and escape out of the waveguide body 12 or may further reflect off the opposing surface and continue to travel within the waveguide body 12, depending upon the incident angle of the light striking such opposing surface. The light eventually leaves the waveguide body 12, preferably before reaching outer ends 20A, 22A. This escape is facilitated by the extraction features 14 which have stepped surfaces parallel to one another. This arrangement gives a tapered appearance to side sections 20, 22. The extracted light may have the light distribution illustrated in FIG. 4A or 4J where the concentric circles mark the magnitude of intensity (candelas: lumens/steradian), and the lines extending radially from the center mark the angle of the exiting light with 0° pointing straight down, 90° to the right and 180° straight up. Any desired light distribution may be realized, however.

Figure 4D:
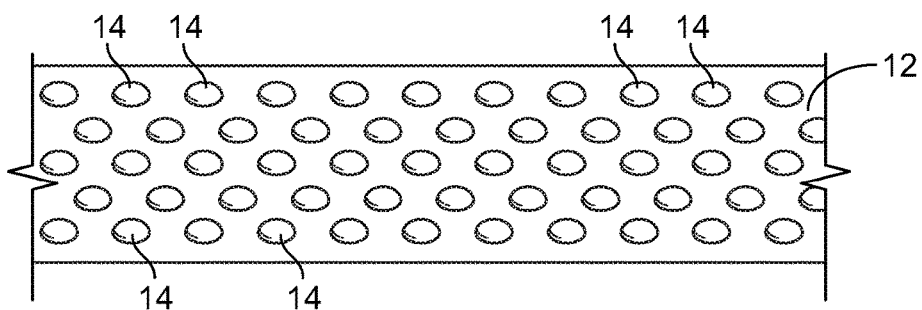
FIG. 4D is a fragmentary isometric view of a waveguide surface showing a particular embodiment of extraction features extending outwardly from the surface of the waveguide.

In an embodiment, extraction features 14 form an outwardly extending protrusion as shown in FIG. 4D. The use of such an extraction feature 14 limits the distribution of light to either an upward or downward direction depending upon which surface of the waveguide body 12, the protrusions extend from. For example, an extraction feature 14 comprised of an outwardly extending protrusion, such as one in the shape of a dome, located on the upper surface of the waveguide body 12 as shown in FIG. 4D would only allow light to emit in an upward direction. The opposite would be true if the outwardly protruding extraction features were featured on the lower surface of the waveguide body 12. These extraction features 14 are particularly useful when combined with the coupling features discussed above.

In an embodiment, the light produced from the LED 26 is reflected from a ceiling in an illuminance maximum to minimum ratio of no greater than about 4:1. More preferably, the light is reflected from the ceiling in an illuminance maximum to minimum ratio between about 1:1 to about 3:1. Most preferably, the light is reflected in an illuminance maximum to minimum ratio of no greater than about 2:1.

The illuminance obtained for the disclosed luminaire is such that, in one embodiment, that use of the luminaire can result in a spacing criteria of about 1:3. In other words, a series of luminaires 10 could each be mounted 10 feet apart at a height of 7 feet above a surface to be illuminated and still achieve an acceptable level of luminance. Up lighting spacing may range from spacing criteria of 1:16 or lower. In other words, luminaires mounted 16 feet apart at a distance of 1 foot from the ceiling will still achieve an acceptable level of illuminance and uniformity. The illustrated embodiment has upward spacing criteria of 1:10 or less. Down light spacing may range from spacing criteria of 1:2 or lower. That is, at 16 feet apart, luminaries may be mounted 8 feet from the task surface and deliver the acceptable level of illuminance and uniformity. In an embodiment, the luminaire may have spacing criteria of 1:3 or less.

FIGS. 5A-5C, 10, 29, and 30 illustrate another embodiment as assembled into a complete luminaire 60 suspended from a ceiling 62. A waveguide body 64 is disposed between end caps 66A, 66B that are, in turn, secured to a housing 68. The housing 68 encloses a driver circuit, although the driver circuit may be disposed at another location. Also, the housing 68 may be made of a thermally conductive material, such as aluminum, and may include heat dissipating structures 70 that radiate heat away from the driver circuit components. The housing 68 may be suspended by brackets 72 and wire rope (i.e., aircraft cable) 74 from appropriate ceiling mounting structures, as is conventional. The luminaire 60 may receive electrical power via an electrical connection cord 76.

Figure 5C:
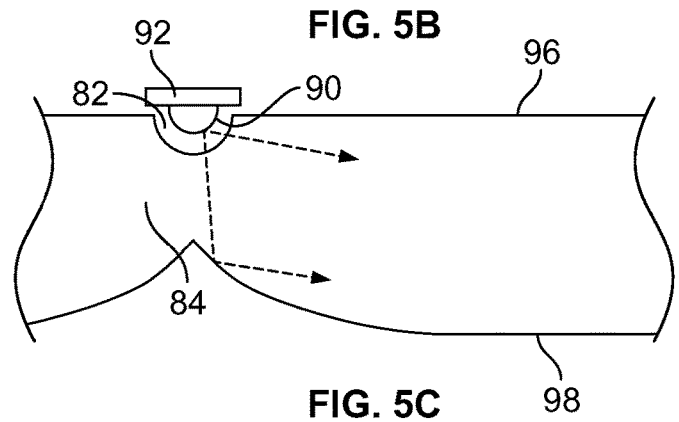
FIG. 5C is an enlarged, fragmentary side elevational view of the central section of the waveguide body of FIG. 5B.

The waveguide body 64 may be oriented in any direction (e.g., horizontally, vertically, or diagonally). As seen in FIGS. 5B and 5C, the waveguide body 64 is inverted (i.e., flipped over) relative to the waveguide body 12. Thus, a cavity 82 similar or identical to the cavity 29 of a coupling portion 84 that is similar or identical to the coupling portion 24 is disposed above a V-shaped curved surface 86 similar or identical to the V-shaped surface 46. As in the previous embodiment, the V-shaped surface may be smooth and uncoated, or may be coated with a specular material or a specular reflective body may disposed adjacent and abutting the V-shaped surface 86 as in the previous embodiment. LED element(s) (FIG. 5C) 90 mounted on a substrate 92 may be secured relative to the waveguide body 64 such that the LED element(s) extend into the cavity 82. The waveguide body 64 otherwise differs from the waveguide body 12 in that side sections 90, 92 corresponding to the side sections 20, 22 are disposed substantially 180 degrees relative to one another, extraction features (not shown) similar or identical to any of the extraction features 14 disclosed herein are disposed in surfaces 96 adjacent the coupling portion 84, and surfaces 98 opposite the surfaces 96 have a greater lateral extent than the surfaces 96. The surfaces 96 are preferably smooth, although such surfaces may be textured as noted with respect to the surfaces 32.

As shown in the various embodiments of the Figures, the lower surfaces 32 of the waveguide body 12 or 64 may be disposed at any angle A relative to an axis B (FIG. 4) lying in a plane normal to the longitudinal axis L and bisecting the coupling portion 24. More preferably, this angle A is between about 45° and about 135° (see, e.g., FIGS. 11-14B). In another embodiment, the lower surface 32 is disposed at an angle A of between about 70° and about 90° relative to the axis B. In the embodiment illustrated in FIGS. 1-4, the lower surface 32 is disposed at an angle A of about 85° relative to the axis B.

Figure 15A:
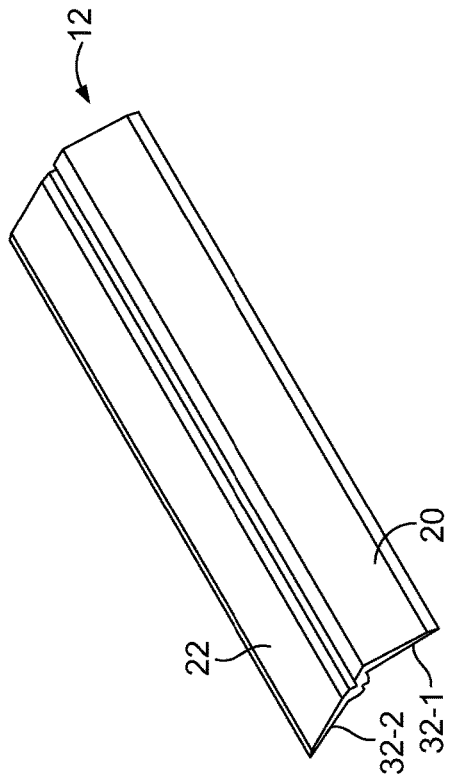
FIG. 15A is an end elevational view of a waveguide body usable in another embodiment of a luminaire.
Figure 15B:
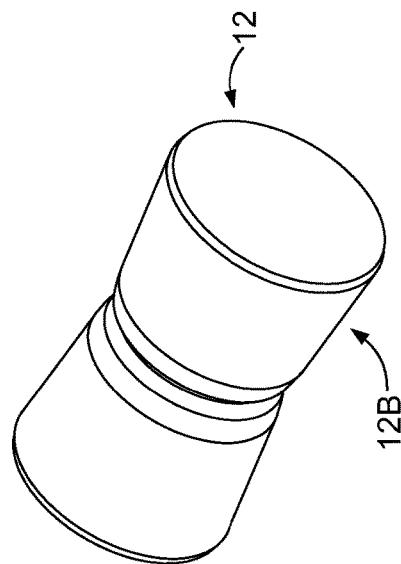
FIG. 15B is an isometric view of the waveguide body of FIG. 15A.

FIGS. 15A and 15B illustrate an embodiment in which the side sections 20, 22 are disposed at different angles, and hence, the embodiment is asymmetric. More particularly, lower surfaces 32-1 and 32-2 of the side sections 20, 22, respectively, form angles C and D, respectively, with respect to lines parallel to the axis B. In the preferred embodiment, the angles C and D are about 85 degrees and about 135 degrees, respectively, although these angles may have any magnitude. The embodiment of FIGS. 15A and 15B may have particular utility when used in a ceiling-suspended luminaire that is used adjacent an area where a wall meets the ceiling. In this case, the section 20 may be directed toward the intersection of the wall and ceiling such that the surface 30 illuminates such intersection and the inside of the room, and the section 22 may be directed away from such intersection to illuminate inner portions of the ceiling and the work spaces inside the room.

Figure 16A:
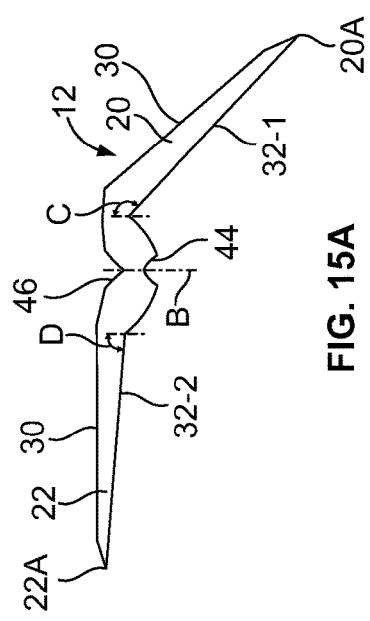
FIG. 16A is an isometric view of yet another waveguide body usable in a still further embodiment of a luminaire.
Figure 16B:
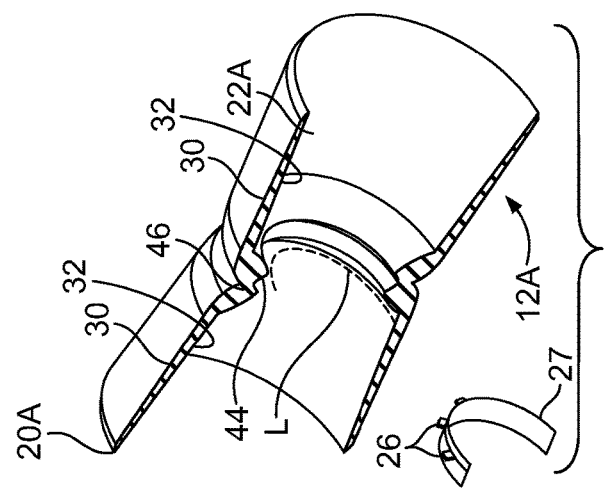
FIG. 16B is an isometric view of a still further waveguide body useable in another embodiment of a luminaire.
Figure 18B:
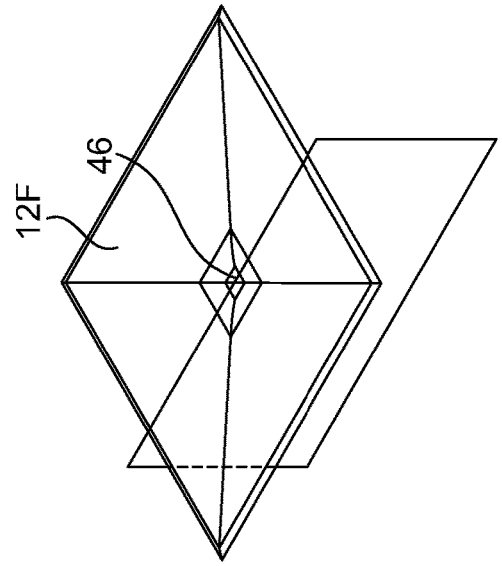
FIG. 18B is an isometric view of a still further waveguide body useable in another embodiment of a luminaire.

Referring next to FIGS. 16A and 16B, the waveguide body may be partially or fully curved to define a curved longitudinal axis L. For example, FIG. 16A illustrates a waveguide body 12A that is partially curved about itself, but which is otherwise identical to the waveguide body 12 of any of the embodiments disclosed herein. The embodiment of FIG. 16A is illustrated as being curved 180 degrees, although the waveguide body may be curved any other arcuate extent, as desired. FIG. 16B illustrates an embodiment where a waveguide body 21B is fully curved about and joined to itself (i.e., the waveguide body is curved 360 degrees) to define a circular longitudinal axis L (not shown) and thereby form a circular cylinder. (It should be noted that FIG. 16A also illustrates the waveguide body of FIG. 16B in cross section). If desired, either of the waveguide bodies 12A, 12B may define other than a partial or full circle in a plane that includes the curved longitudinal axis L. Thus, for example, an ellipse or other shape may be defined. The waveguide body 21B may be otherwise identical to any of the embodiments disclosed herein and may be used in a luminaire. In such a case LED elements 26 may be disposed on a curved substrate 27 wherein the latter is secured to the waveguide body 12A, 12B in any suitable fashion such that the LED elements 26 extend into the cavity 29 defined by the surfaces 44.

Figure 17B:
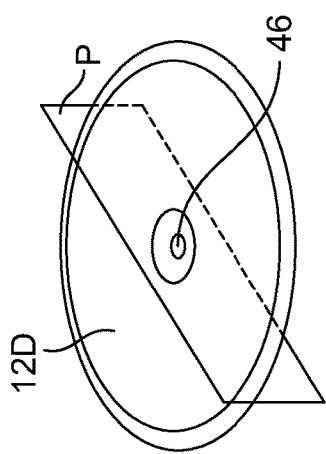
FIG. 17B is an isometric view of a still further waveguide body useable in another embodiment of a luminaire.
Figure 17A:
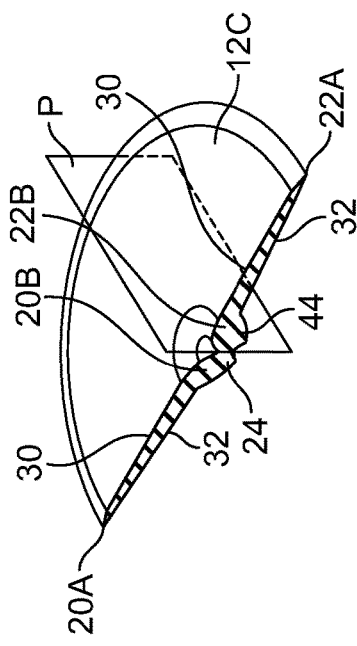
FIG. 17A is an isometric view of yet another waveguide body usable in a still further embodiment of a luminaire.
Figure 18A:
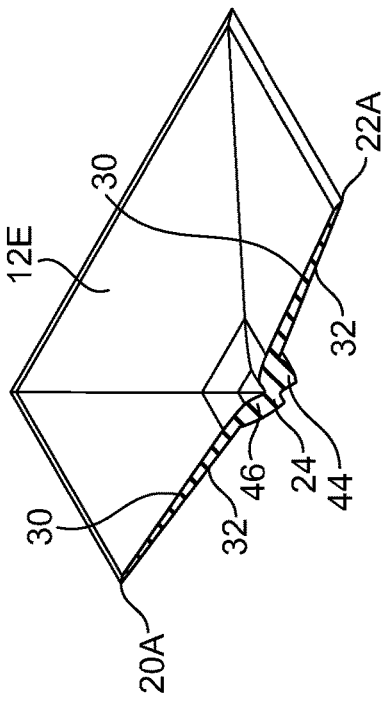
FIG. 18A is an isometric view of yet another waveguide body usable in a still further embodiment of a luminaire.
Figure 19A:
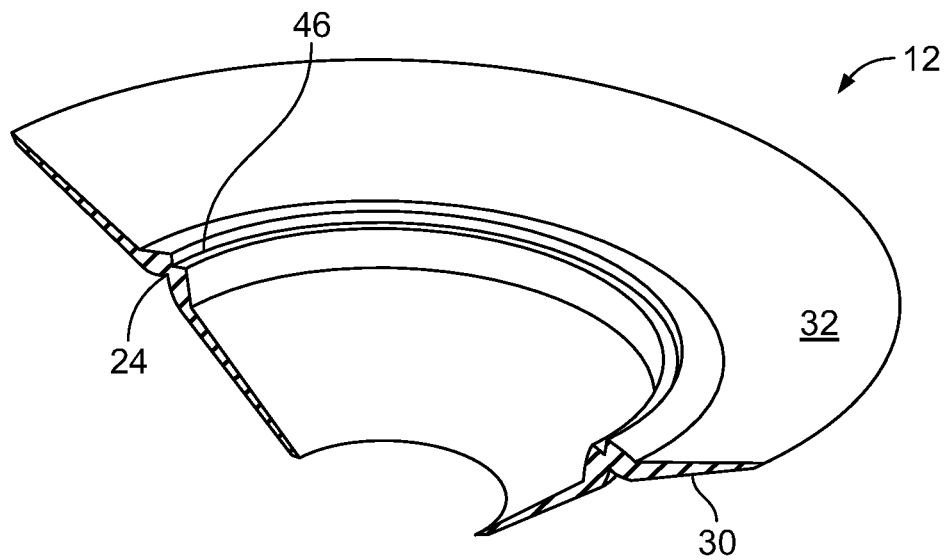
FIG. 19A is an isometric view of yet another waveguide body usable in a still further embodiment of a luminaire.
Figure 19B:
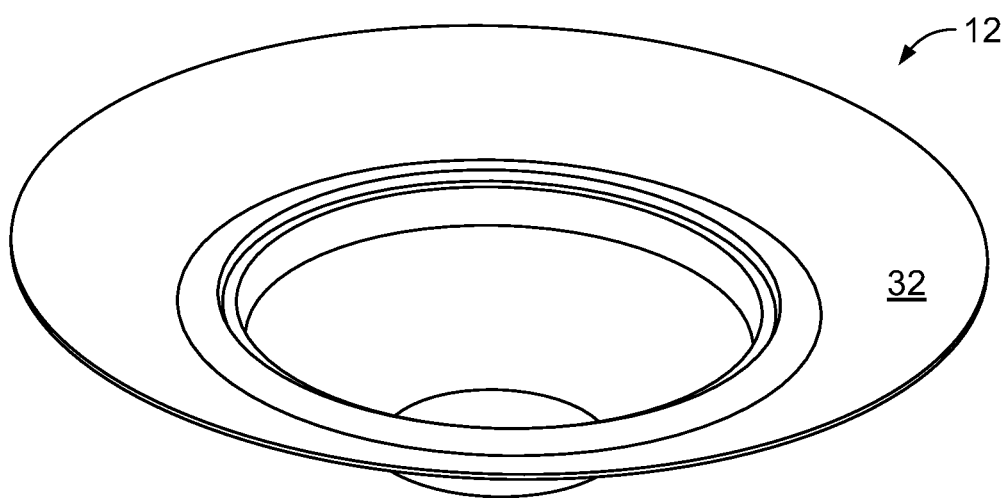
FIG. 19B is an isometric view of a still further waveguide body useable in another embodiment of a luminaire.
Figure 20:
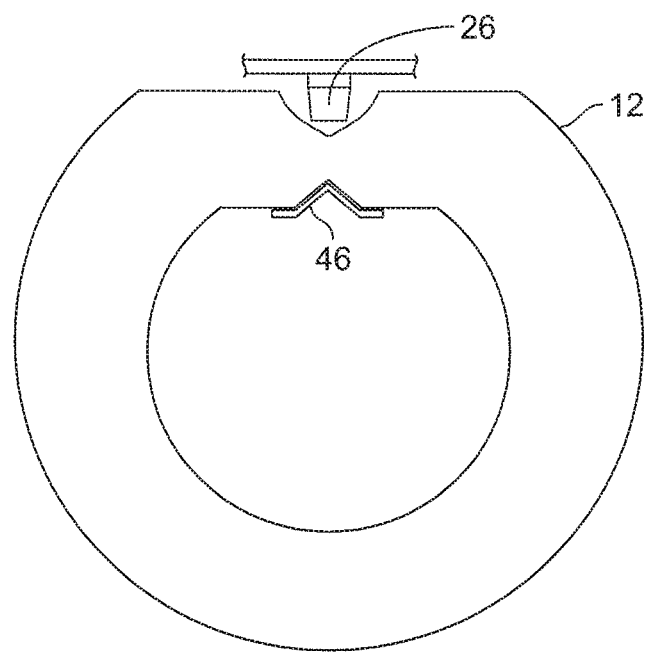
FIG. 20 is an end view of an embodiment of a luminaire.

FIGS. 17A-20 and 23A-25D illustrate still further embodiments of waveguides that utilize the coupling portion 24 and the V-shaped surface 46. (As in the case of FIGS. 16 and 16B, FIGS. 17A and 18A not only illustrate alternative embodiments, but also show the embodiments of FIGS. 17B and 18B, respectively). The embodiments of these Figures are symmetric about a plane P (seen in FIGS. 17A and 17B) passing through the centers of the coupling sections and have a coupling portion 24 of limited size that can accommodate one or at most several LED elements. FIGS. 17A and 17B illustrate half and full circular waveguide bodies 12C, 12D, respectively, whereas FIGS. 18A and 18B depict half and full square waveguide bodies 12E, 12F, respectively. In the illustrated embodiments, the waveguide bodies 12C-12F have cross-sectional shapes similar or identical to the embodiments of FIGS. 1-4, although any of these embodiments may have a different cross-sectional shape, if desired. Other similar shapes are also possible, such as quarter circular or quarter square shapes, or shapes that are other than circular or square.

The alternate embodiments distribute light in the fashion noted in connection with FIGS. 1-3, and may be used in any luminaire, for example as disclosed herein, with suitable modifications as may be necessary or desirable to accommodate the different waveguide body shape. For example, any of the waveguide bodies disclosed herein may be used in the luminaire 60.

FIGS. 1, 2, and 2A also disclose a waveguide body 12 having a central section 18 and a first and a second separate side sections 20, 22 that extend away from the central section 18 along first and second directions, respectively. The central section 18 includes a coupling portion 24 located in the central section 18.

In an embodiment, the waveguide body 12 includes a plurality of light extraction features 14 that extract out of the side sections 20, 22 of the waveguide body 12, emitted light generated by an LED light source proximal to the waveguide body 12. In another embodiment, each of the first and the second side sections 20, 22 has an upper and a lower surface 30, 32 and a first end 34 proximal to the coupling portion 24 and a second end 20A, 22A distal to the coupling portion 24. The first end 34 has a first thickness T1, the second end has a second thickness T2, and the first thickness T1 is greater than the second thickness T2. In a particular embodiment, for example, the first thickness T1 is no greater than about 6 millimeters and the second thickness T2 is no less than about 2 millimeters.

In still another embodiment, the coupling portion 24 of the waveguide body 12 curves upward towards the second end 20A.

Figure 4E:
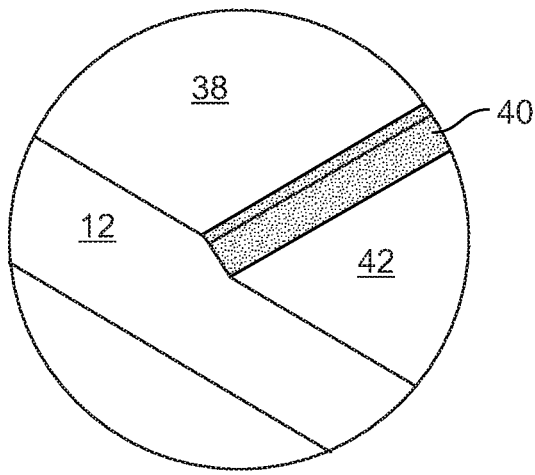
FIG. 4E is fragmentary view of an extraction feature used in a further embodiment of the disclosure.

In an embodiment, the upper surface 30 of the waveguide body 12 is textured. In a more particular embodiment, each of the plurality of light extraction features 14 is defined by a first surface 38, and an intermediate surface 40 extends from the first surface 38 to a second surface 42, as shown in FIGS. 4B, 4C, 4E, and 4G. All or some of the intermediate surfaces 40 may be planar or curved with each intermediate surface 40 having a curve of constant radius. In the latter case the surface 40 is preferably, although not necessarily, convex in cross section as seen in FIG. 4C. In some embodiments, the surface 40 may include a planar portion as well as a curved portion as shown in FIG. 4E. In other embodiments, all or some of the intermediate surfaces 40 may be scalloped as shown in FIGS. 4G-4I, in combination with the planar or constant radius curvature noted above. Additionally, all or some of the intermediate surfaces 40 may be textured while both or one of the surfaces 30, 42 are smooth, as seen in FIGS. 4E and 4G. Such texturing may be accomplished by cutting the surface with a polycrystalline diamond, or by any other suitable means. Surfaces 40 and/or extraction features 14 may be molded, embossed, or otherwise formed in one or both of the upper and lower surfaces 30, 32 of the waveguide 12. Alternatively, or in addition to, a film (not shown) including extraction features may be adhered, laminated, or otherwise secured to one or both of the upper and lower surfaces 30, 32 to effectuate light extraction.

In the embodiments shown in FIGS. 4E, 4F, 4G, and 4H, the surface 40 disclosed herein may have the dimensions noted in the following table. It should be noted that the dimensions in the following table as exemplary only and not limiting:

TABLE 3

Figure 4F:
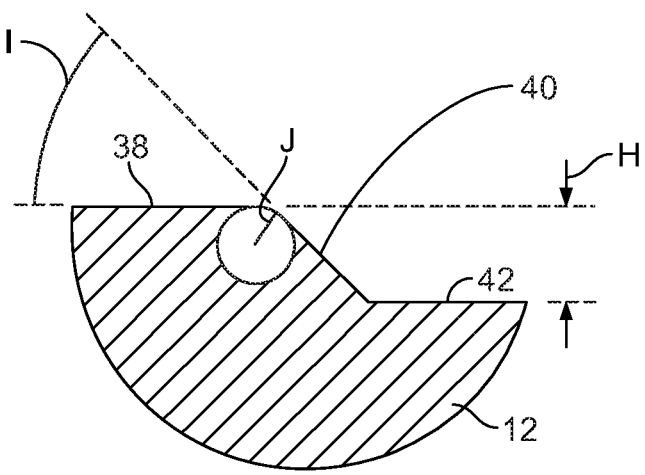
FIG. 4F is an enlarged, fragmentary, cross sectional view of the extraction feature of FIG. 4E.
Figure 4G:
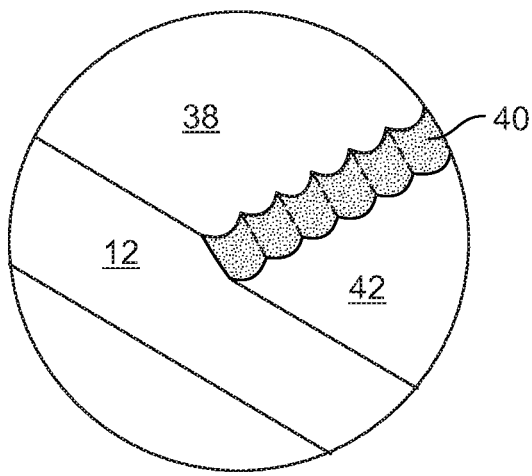
FIG. 4G is a fragmentary view of an extraction feature used in a further embodiment of the disclosure.
Figure 4H:
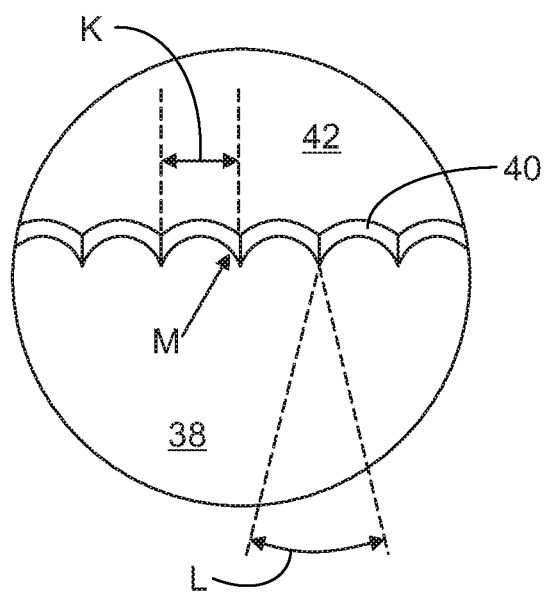
FIG. 4H is an enlarged plan view of the extraction feature of FIG. 4G.
Figure 4I:
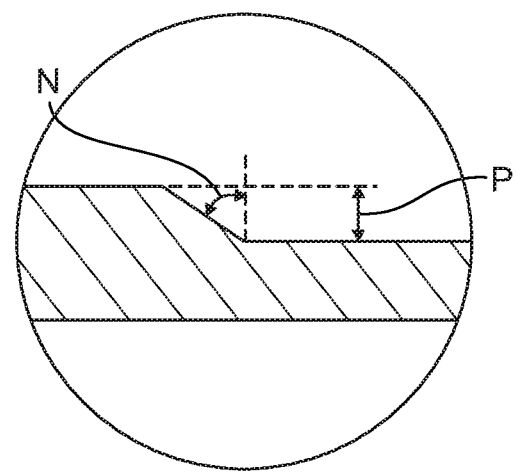
FIG. 4I is an enlarged, fragmentary, cross sectional view of the extraction feature of FIG. 4G.
Figure 4J:
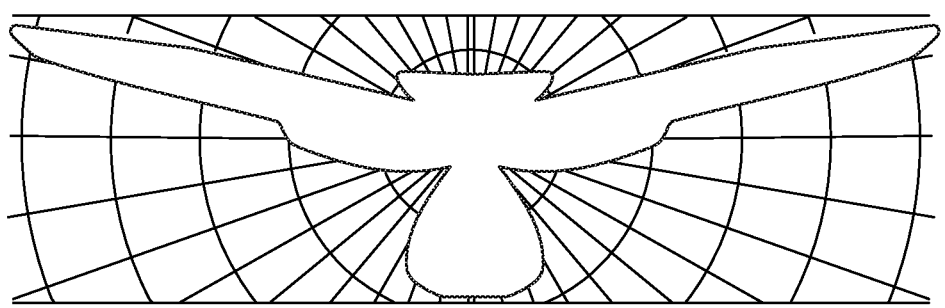
FIG. 4J is a graph illustrating an alternative desired light distribution emitted from the luminaire of FIGS. 1 and 2.

| | NOMINAL DIMENSION (Millimeters - unless otherwise specified) |
|---|---|
| FIG. 4F | |
| H | 0.05 |
| I | 45 degrees |
| J | 0.005 (radius of curvature) |
| FIG. 4H | |
| K | 0.340 |
| L | 27.5 degrees |
| M | 0.175 (radius of curvature) |
| FIG. 4I | |
| N | 37.5 degrees |
| P | 0.050 |

In another embodiment, as seen in FIGS. 7 and 8, the intermediate surfaces 40 are planar, and the intermediate surfaces 40 are all parallel to one another, although the surfaces 40 need not all be planar or parallel. In another embodiment, the intermediate surfaces 40 are parallel to one another and are disposed at non-zero angles with respect to associated first and second surfaces 38, 40. The angle between each intermediate surface 40 and a line tangent to an adjacent associated surface 38 or 42 where the surface 38 or 42 meets the surface 40 may be relatively steep (for example, as seen in FIG. 7) or may be relatively shallow (e.g., as seen in FIG. 8). This angle (or any other related angle, such as the angle between the intermediate surface 40 and a line tangent to an adjacent associated surface 42 where the surface 42 meets the surface 40) and the size of each intermediate surface 40 affect the output distribution of light from the waveguide body 12.

In a more particular version of this embodiment, the first surface 38 is displaced from the second surface 42 by a particular distance and all of the distances between the first and the second surface of each of the plurality of light extraction features are equal. In a still more particular version of this embodiment, the intermediate surface 40 of each step of each of the plurality of extraction features 14 is angled at the same angle.

In one embodiment, the lower surface 32 of the first and the second side sections 20, 22 of the waveguide body 12 are textured. In a particular version of this embodiment, the lower surface 32 includes a plurality of extraction features 14, as discussed above.

As shown in FIG. 3, the coupling portion 24 has a concave first surface 44 defining the cavity 29, and a curved V-shaped second surface 46 disposed opposite the concave first surface 44. The concave surface 44 may be textured so as to allow for better color mixing of the light. In one embodiment, the V-shaped second surface 46 is smooth and uncoated. In still another embodiment, the V-shaped second surface 46 may be a textured surface and, in a more particular embodiment, an optional layer of specular material 48 may be disposed on the V-shaped second surface 46, as shown in FIG. 6.

Figure 21:
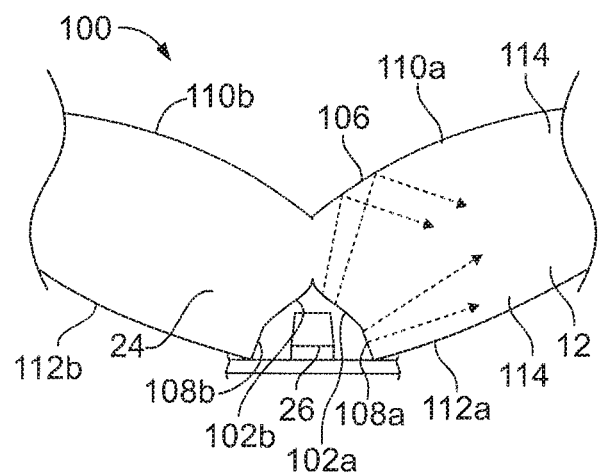
FIG. 21 is a side elevation view of an embodiment of a central section of a waveguide disclosed in the application.

The concave first surface 44 may include both a curved and linear portion, as shown as 102 and 108 in FIG. 21. Also, the surface of the central section 18 opposite the V-shaped second surface 46 may be curved in a gentle, parabolic manner as shown, for example in FIGS. 13A-15B and 21-22, in order to aid in collimating the reflected rays as the greater the curvature, the more collimated the rays. Referring to FIG. 21, the first surface 44 includes curved and linear portions 102a, 108a opposite respective curved and linear portions 102b, 108b. Such surfaces 102a, 108a and respective surfaces 102b, 108b may be mirror images of one another or have different geometries.

Figure 30:
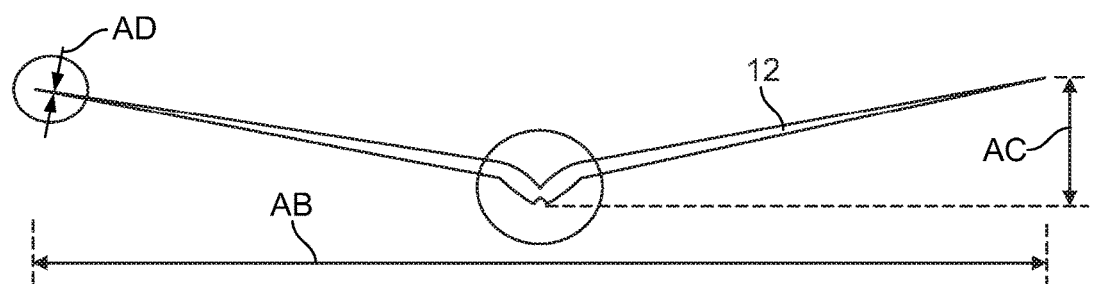
FIG. 30 is a further embodiment of a waveguide used in yet another embodiment of a disclosed luminaire.

In the embodiments shown in FIGS. 30 and 30A, the waveguide 12 disclosed herein may have the dimensions noted in the following table. It should be noted that the dimensions in the following table as exemplary only and not limiting.

TABLE 4

Figure 30A:
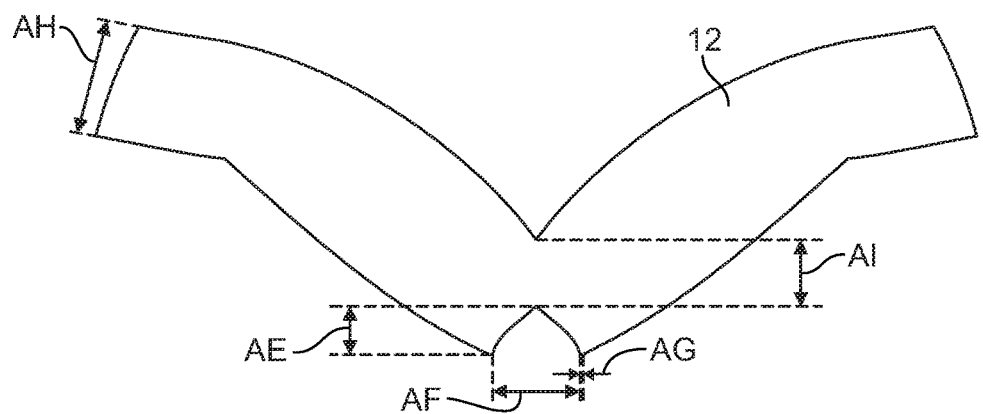
FIG. 30A is a side elevation view of a central section of the embodiment of FIG. 30.

| FIG. 30A | NOMINAL DIMENSION (Millimeters - unless otherwise specified) |
|---|---|
| AB | 563.355 |
| AC | 66.338 |
| AD | 1.956 |
| AE | 2.850 |
| AF | 5.60 |
| AG | 0.20 |
| AH | 7.0 |
| AI | 3.965 |

In yet another embodiment, the waveguide body 12 may be made of a transparent acrylic.

Also disclosed is a coupling optic 100 for a waveguide body 12. As shown in FIG. 21, the coupling optic 100 includes a first coupling section 102 disposed in an input region 104 of the coupling optic 100, a first reflection portion 106 remote from the input region 104 and adapted to reflect light entering the first coupling section 102 into the waveguide body 12, and a second coupling section 108 disposed at the input region 104 and distinct from the first coupling section 102 and adapted to refract light entering the second coupling section 102 directly into the waveguide body 12.

In an embodiment, the coupling optic 100 has a first surface 110 that curves outward from a center of the coupling portion 24, and a second surface 112 that curves outward from the center of the coupling portion 24 wherein the second surface 112 is opposite the first surface 110. In one embodiment, both or one of the first and second surfaces 110, 112 may be parabolic in shape and centered on the light source 26. In another embodiment, one or both of the first and second surfaces 110, 112 may be "free formed" in that it is specifically designed to control the angles of the light rays or the spread of the collimated group of rays that are directed through the waveguide 12. In other embodiments, one or both of the first and second surfaces 110, 112 may be a combination of a parabolic and free formed shape. Additionally, referring to FIG. 21, the coupling optic 100 includes third and fourth surfaces 110b, 112b opposite respective first and second surfaces 110a, 112a. First and third surfaces 110a, 110b may be mirror images of each other or have different shapes. Similarly, second and fourth surfaces 112a, 112b may be mirror images of each other or have different shapes. The coupling optic 100 also has an end 114 distal to the center of the coupling portion 24, and a waveguide 12 is attached to the end 114. In a more specific version of the embodiment, the ends 114 of the first and second surfaces 110, 112 define a line that is approximately perpendicular to the first surface 110 and the second surface 112. Each of the first and second surfaces 110, 112 may be textured surfaces.

When in operation, the primarily lambertian distribution of light emitted from the LED element(s) 26 travels through the first coupling section 102 where it then strikes the first reflection portion 106. The surface of the first coupling section 102 redirects the light by TIR toward the second surface 112 or into the waveguide 12 as one set of substantially collimated or parallel rays of light that bounce due to total internal reflection between the upper and lower surfaces of the waveguide 12 until such rays exceed the critical angle of the material of the waveguide body 12 and escape.

Figure 28:
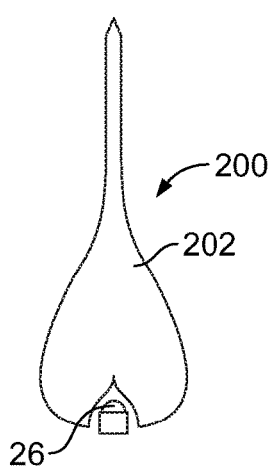
FIG. 28 is a side elevation view of another embodiment of a waveguide body.
Figure 28A:
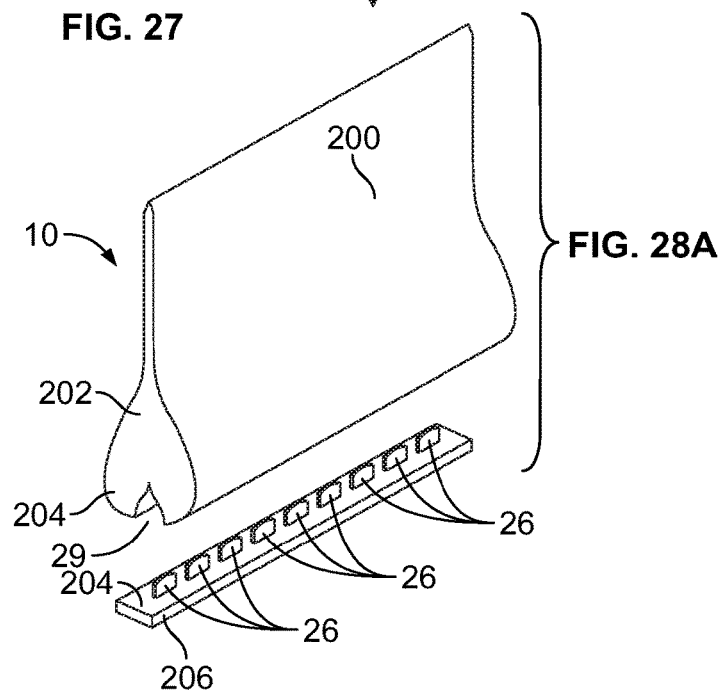
FIG. 28A is an exploded isometric view of the embodiment of FIG. 28.
Figure 29:
FIG. 29 is a side elevation view of another embodiment of a waveguide body.

FIGS. 28 and 28A illustrate a waveguide 200 comprising a waveguide body 202 and a series of LEDs 26 of any suitable type, including the types disclosed herein, disposed on a surface 204 of a substrate 206. The surface 204 may be coated with a specular or white reflective surface. The waveguide body 202 includes a coupling portion 208 similar or identical to the coupling portion 24 disclosed above. The side sections of previous embodiments are replaced by a single light emitting section 204 that may include stepped (or other shaped) extraction features, as disclosed previously. As in other embodiments light rays may be arranged into groups wherein the light rays of each group travel at angles within a desired range of one another, within the TIR limits of the waveguide body material, so that the light rays TIR at least once within the waveguide body.

FIGS. 31-44 illustrate yet another embodiment of a luminaire 360 suspended from a ceiling. The luminaire 360 includes one or more luminaire sections that are assembled together in end to end fashion as noted in greater detail hereinafter. The luminaire sections are preferably identical (with the exception of end caps as described below) and, while the drawings illustrate the use of two sections, any number of luminaire sections may be joined together to obtain a luminaire of desired length, with the only limitation on the number of sections being the electrical power available to energize the sections. Also, while the drawings illustrate that the luminaire 360 is suspended from a ceiling at two ends 362, 364 thereof and that electrical power is supplied to the luminaire 360 at the end 362, it should be noted that the luminaire 360 may be suspended from or mounted to any surface other than a ceiling, including a vertical or horizontal or inclined surface, and that the luminaire may have at least one, and preferably more than one suspension or mounting points located at the ends and/or intermediate portions of the luminaire 360 and/or may receive power at more than one portion thereof, as necessary or desirable.

Figure 31:
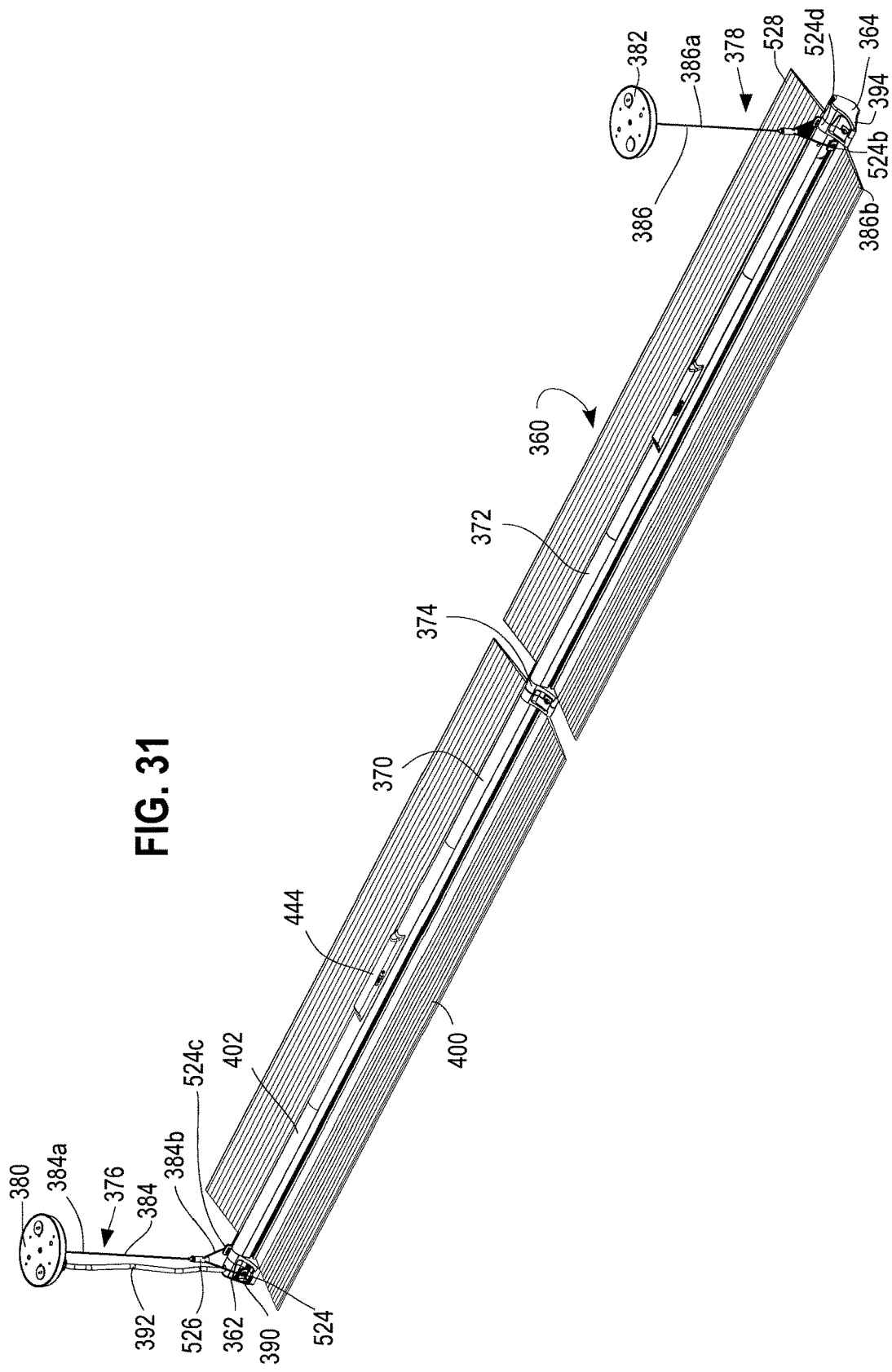
FIG. 31 is an isometric view of yet another embodiment of a luminaire.
Figure 32:
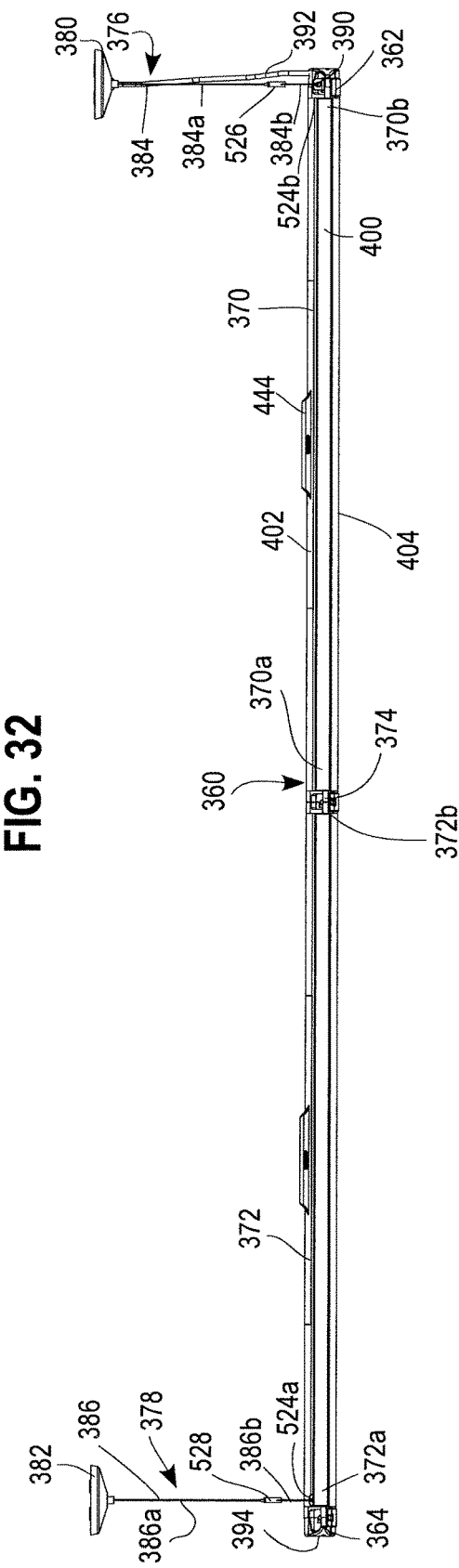
FIG. 32 is a side elevation view of the embodiment of FIG. 31.
Figure 33:
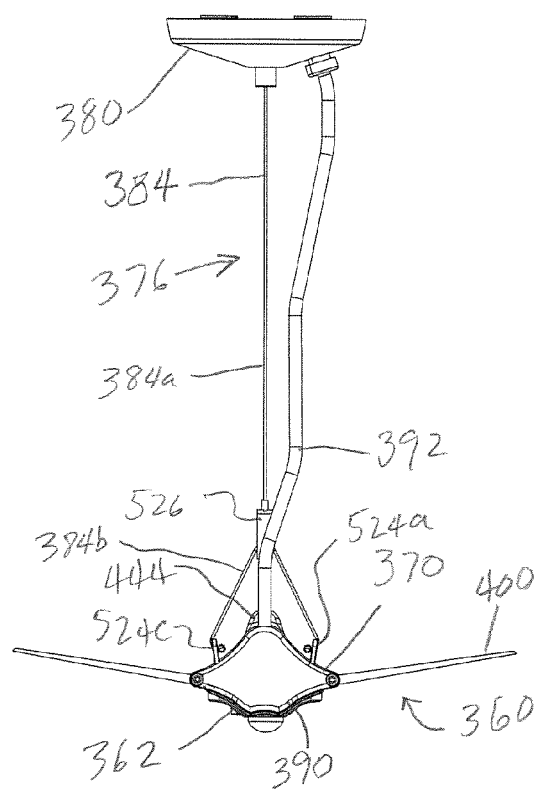
FIG. 33 is an end elevation view of the embodiment of FIG. 31.

Referring specifically to FIGS. 31-33, the illustrated luminaire 360 includes first and second luminaire sections 370, 372 that are joined together at an intermediate coupling section 374. First and second suspension members 376, 378 include mounting plates 380, 382, respectively, adapted to be mounted to ceiling junction boxes (not shown) and aircraft cables 384, 386, respectively, that are secured as described hereinafter to the luminaire 360. The first luminaire section 370 includes a power input end cap 390 disposed at the end 362 and adapted to receive electrical power via a cord 392. A further end cap 394 is disposed at the end 364.

Referring to FIGS. 34-38 and 38A, the section 370 is hereinafter described in detail, it being understood that the section 372 is identical thereto. The section 370 includes a waveguide body 400, a first hollow structural member 402 disposed on a first side of the waveguide body 400, and a second hollow structural member 404 disposed on a second side of the waveguide body opposite the first side. Preferably, each of the first and second structural members is made of extruded aluminum, although any suitable material or combinations of materials could be used. The first and second structural members 402, 404 and the waveguide body 400 are secured to one another by one or more fasteners, such as a bolt 406 (FIG. 39) that extends through a bore 408 in the second structural member 404, and further extends through aligned bores 410, 412 in the waveguide body 400 and the first structural member 402 (the bore 412 is visible in FIG. 38A). A nut 414 is threaded onto the bolt 406.

Figure 38:
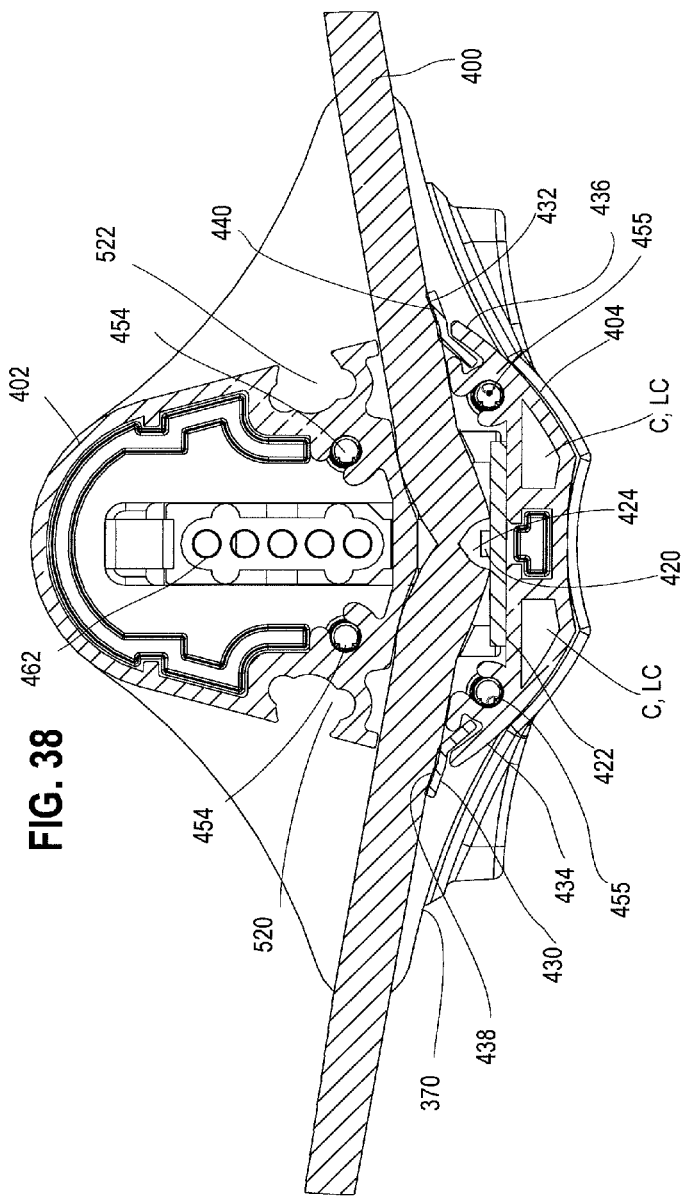
FIG. 38 is an enlarged fragmentary view illustrating the structure of FIG. 37 in greater detail.
Figure 38A:
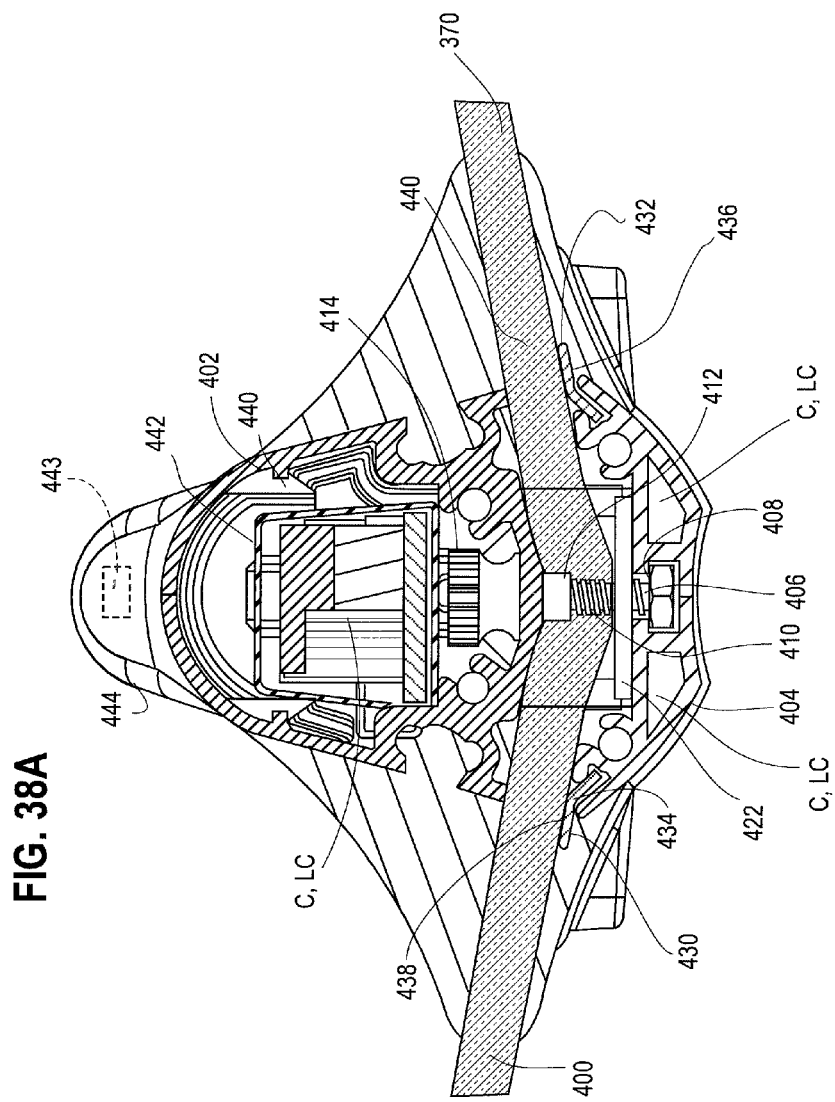
FIG. 38A is an enlarged fragmentary sectional view taken generally along the lines 38A-38A of FIG. 34.
Figure 39:
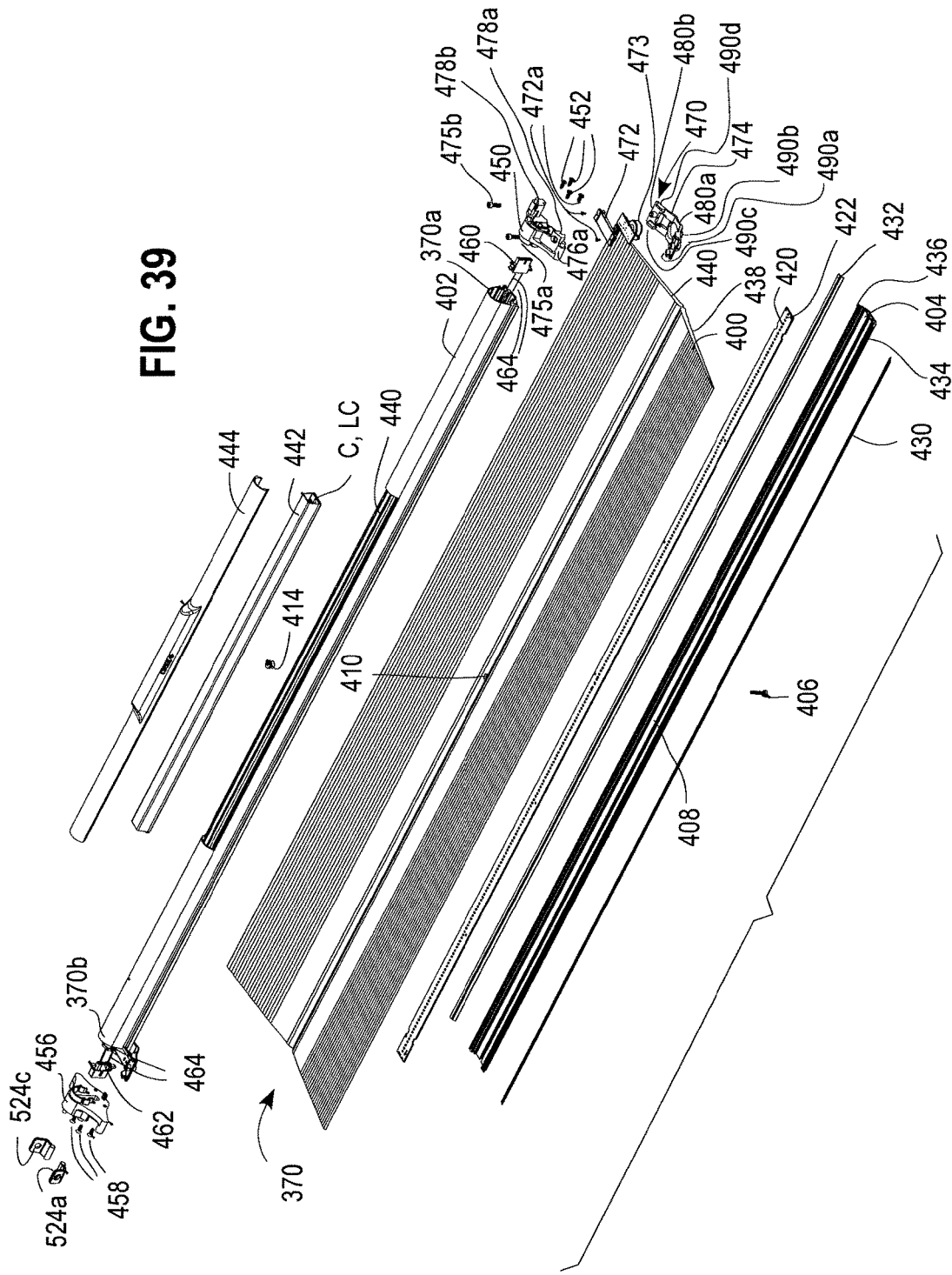
FIG. 39 is an exploded isometric view of the luminaire section of FIG. 34.

A plurality of LEDs 420 as described in connection with the preceding embodiments is disposed on a circuit board 422 carried by the second structural member 404 (FIGS. 38 and 39). Referring specifically to FIG. 38, the LEDs 420 extend into the coupling cavity 424 of the waveguide body 400. The waveguide body 400 is similar or identical to any of the waveguide bodies described hereinabove. Two optional elongate reflective strips 430, 432 (seen in FIGS. 38, 38A, and 39) are disposed between first and second side flanges 434, 436, respectively, and bottom surfaces 438, 440, respectively, of the waveguide body 400. The reflective strips 430, 432 obscure the LEDs 420 so that the LEDs 420 cannot be directly observed.

The first structural member 402 includes an opening 440 (FIGS. 38A, 39) that permits access to the hollow interior of the member 402. A housing 442 that contains one or more components of the circuit C and/or the circuit LC described above is disposed within the first structural member 402 and the housing 442 is secured therein in any suitable fashion. One or more communication components forming a part of the light control circuit LC, such as an RF antenna 443 (FIG. 38A) that senses RF energy, may be disposed above the housing 402 and a cover 444 is secured by, for example, a snap fit, in the opening 440 above the housing 442 and the communication components. The communication components may be included, for example, to allow the luminaire 360 to communicate with an external wireless controller, such as disclosed in U.S. patent application Ser. No. 13/782,040, filed Mar. 1, 2013, entitled "Lighting Fixture for Distributed Control" or U.S. Provisional Patent Application No. 61/932,058, filed Jan. 27, 2014, entitled "Enhanced Network Lighting" both owned by the assignee of the present application and the disclosures of which are incorporated by reference herein. More generally, the control circuit LC includes at least one of a network component, an RF component, a control component, and a sensor. The cover 444 may be made of plastic or any other non-electrically conductive material that allows transmission of electromagnetic waves therethrough.

Referring to FIGS. 39-44, a male junction member 450 is secured to a first end 370a of the section 370 by fasteners in the form of screws 452 (FIG. 39) that threadedly engage cylindrical surfaces 454, 455 formed in the first structural member 402 and the second structural member 404, respectively. A female junction member 456 is secured to a second end 372b of the section 372 by further fasteners in the form of screws 458 that are threaded into the cylindrical surfaces 454, 455 (the surfaces 454, 455 are visible in FIG. 38 and extend the full length of the section 370, but need not do so, in which case the fasteners may engage other surfaces, as should be evident). Complementary first and second electrical connectors 460, 462 are electrically coupled to conductors in the form of wires 464 that extend into the first structural member 402 and interconnect with components of the circuit C and further extend into the second structural member 404 and connect to the circuit board 422. The first electrical connector 460 is secured within an opening 466 (FIG. 35) extending through the male junction member 450 by any suitable means, such as a snap fit. Similarly, the second electrical connector 462 is secured within an opening 468 (FIG. 36) extending through the female junction member 456 by any suitable means, such as a snap fit.

Referring next to FIGS. 39-44, a clamping member 470 (FIGS. 39-41, 43, and 44) includes an insulator plate 472 that is secured by bolts or other fasteners 472a to threaded bores, thereby capturing a circuit board 473a and one or more optional sensors, such as a knob-shaped sensor 473b, inside an opening 474 (FIGS. 39, 39A, 43, and 44). The circuit board 473a and the sensor 473b comprise an optional part of the control circuit LC and provide an indication of ambient lighting levels thereto. The insulator plate 472 electrically isolates the circuit board 473a. First and second clamping fasteners 475a, 475b extend through bores 476a, 476b in side portions 478a, 478b of the male junction member 450 and into threaded bosses 480a, 480b (FIGS. 39 and 39A) of the clamping member 470. The luminaire section 370, as well as other sections, such as the section 372, are preferably (although not necessarily) shipped with the clamping fasteners 475a, 475b only partially threaded into the threaded bosses 480a, 480b to facilitate assembly by an end user.

Figure 40:
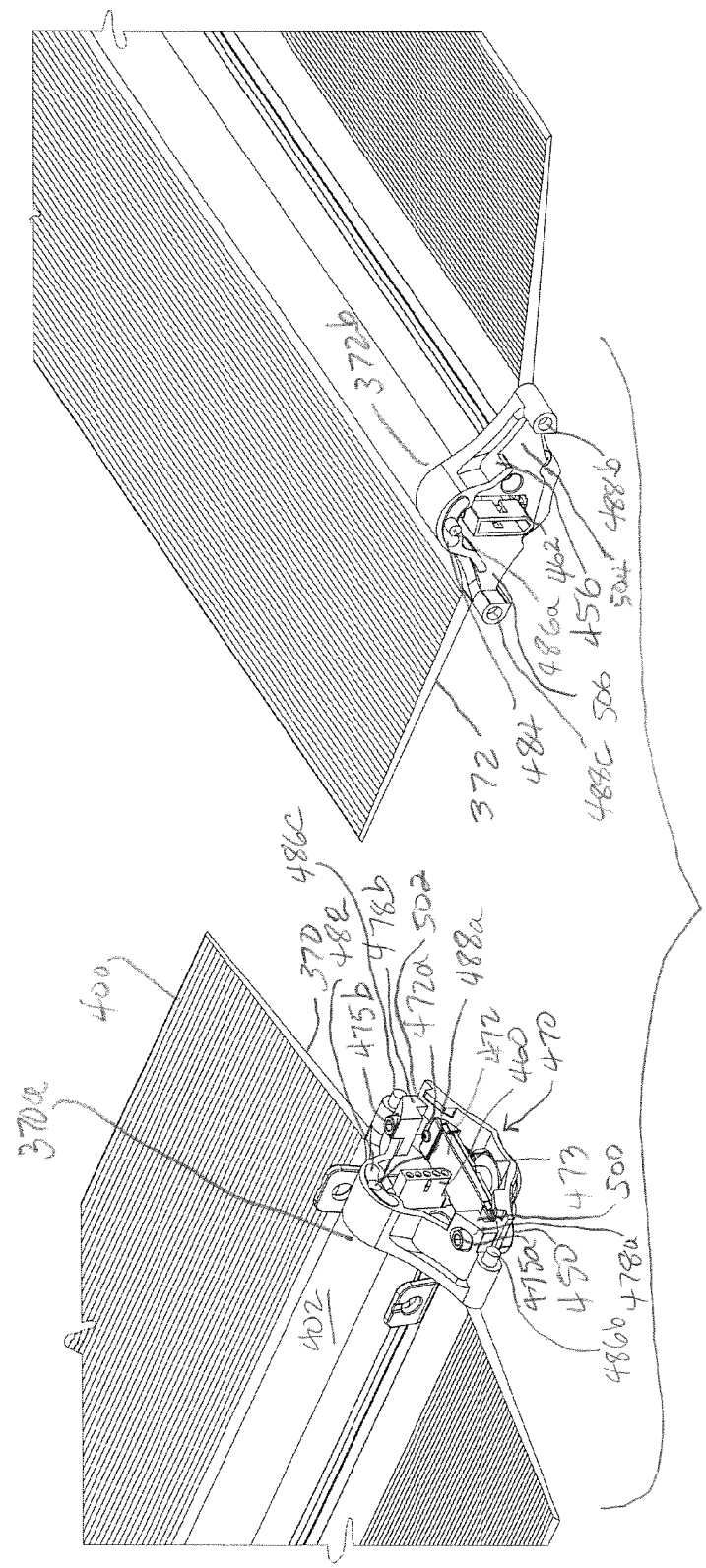
FIGS. 40-42 are isometric views illustrating a sequence of steps to assemble luminaire sections.
Figure 41:
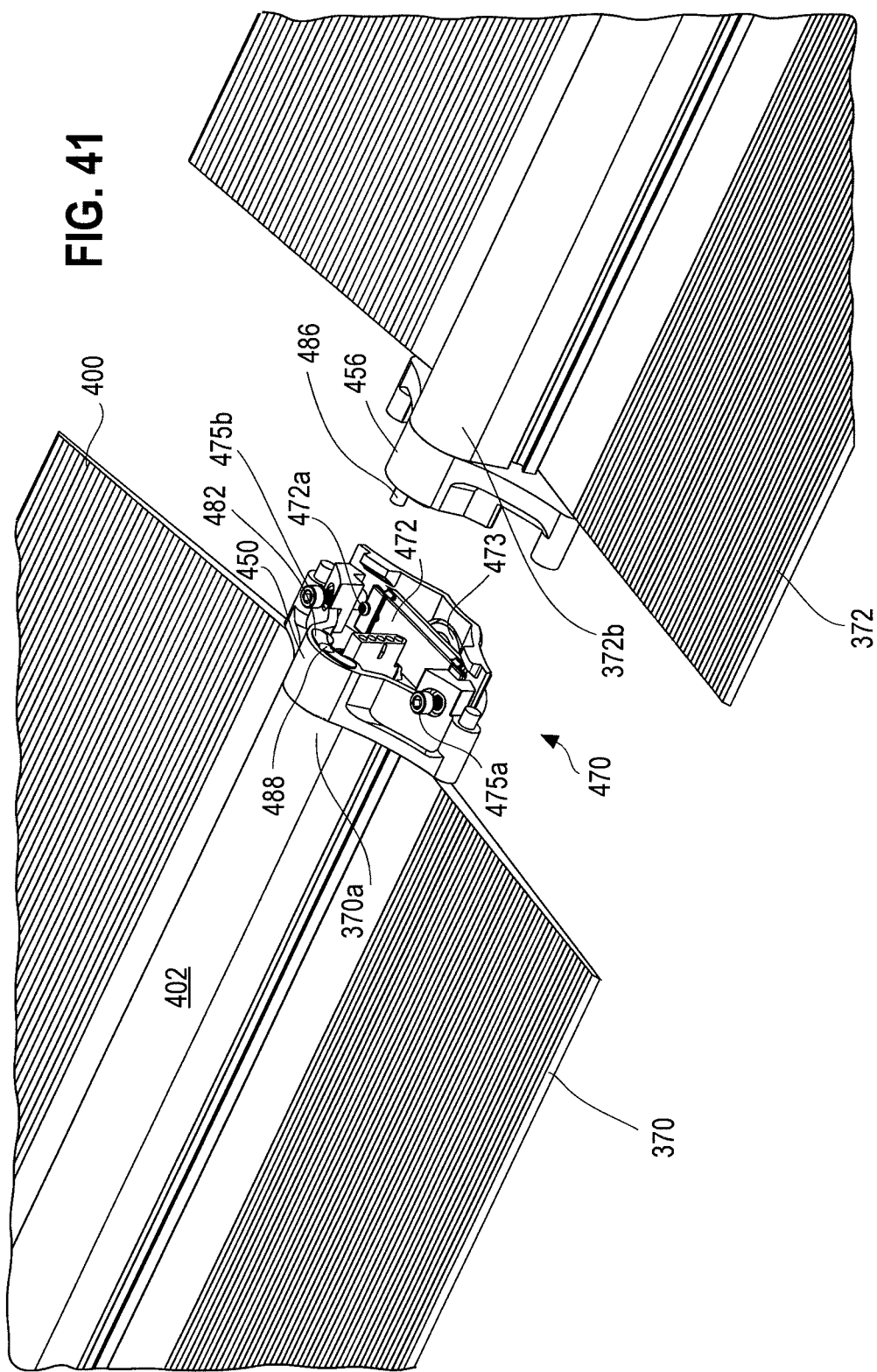
Figure 42:
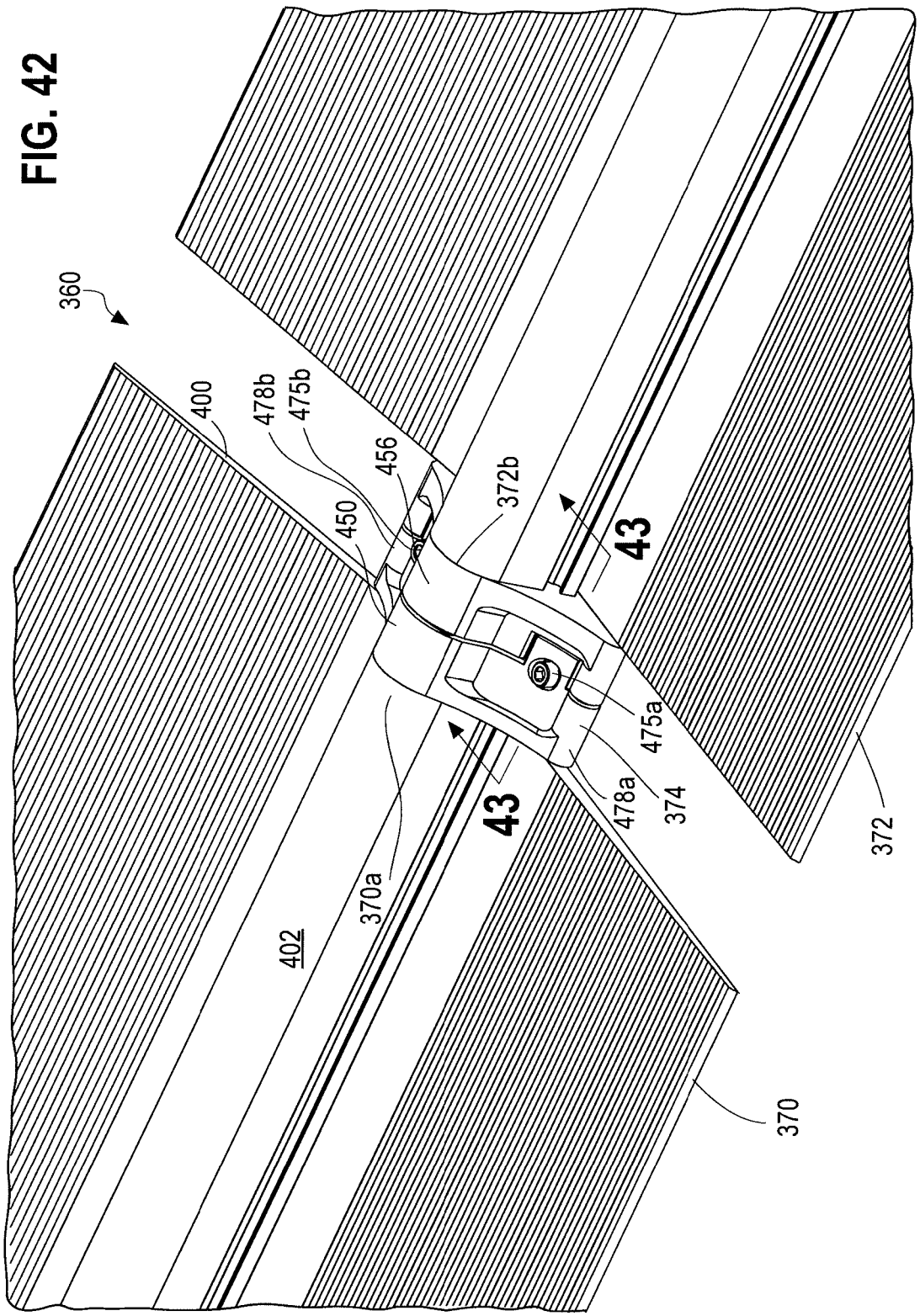
Figure 43:
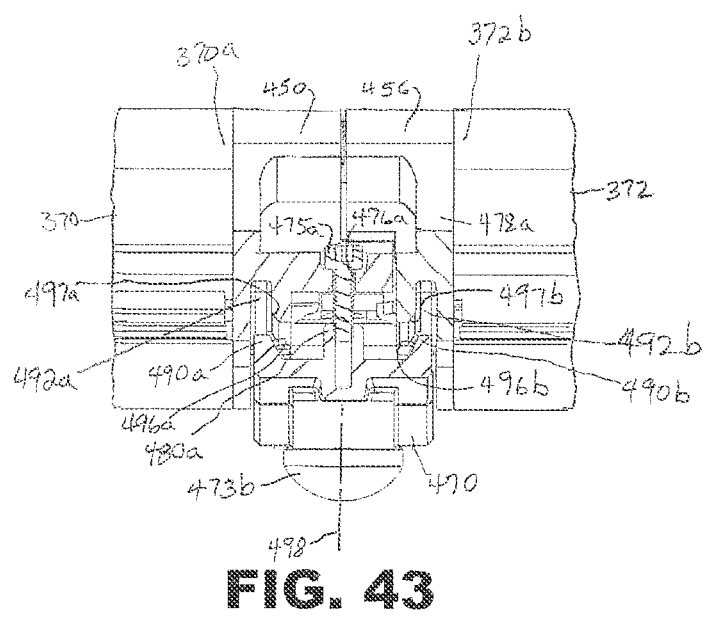
FIGS. 43 and 44 are sectional views taken generally along the lines 43-43 of FIG. 42 before and after tightening of the clamping fasteners, respectively.
Figure 44:
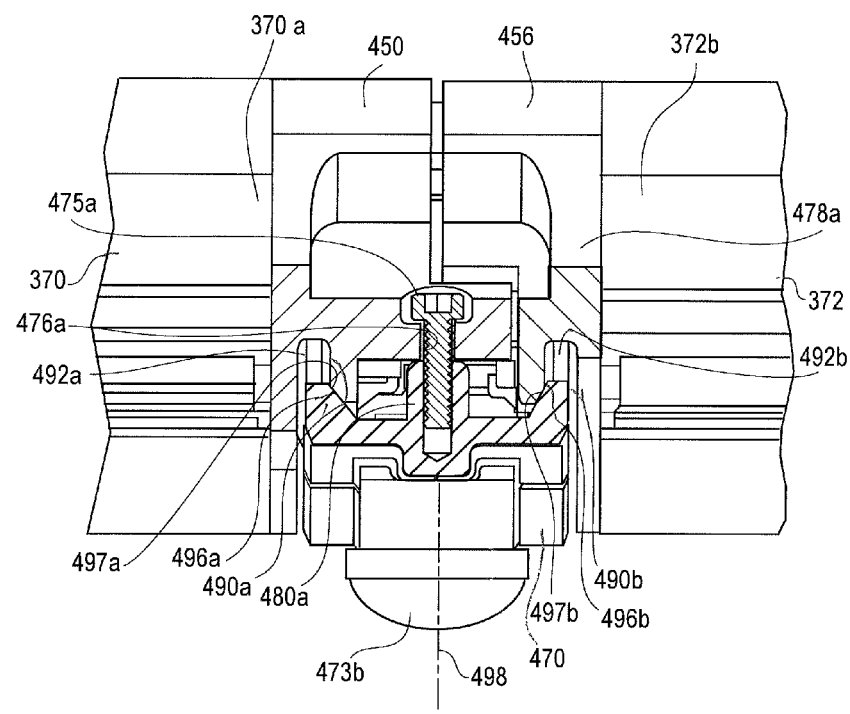

FIGS. 40-42 illustrate the process of assembling the sections 370, 372. FIG. 40 illustrates the male junction member 450 disposed on the end 370a of the section 370 and the female junction member 456 disposed on an end 372b of the section 372. Prior to assembly, the clamping member 470 is loosely disposed on the male junction member 450 due to the partial threading of the clamping fasteners 475a, 475b in the threaded bosses 480a, 480b, respectively. (The clamping fasteners 475 are partially unthreaded out of the bosses 480 if the fasteners are initially fully threaded therein so that the clamping member 470 is allowed to move away from the male junction member 450 before assembly.) Referring next to FIG. 41, the sections 370 and 372 are then aligned as shown and the sections 370 and 372 are then brought together and mated as seen in FIG. 42 such that two compression surfaces 482 and 484 (FIGS. 40 and 41) of the male junction member 450 and the female junction member 456, respectively, contact one another and such that locating pins 486a-486c are received within bores 488a-488c, respectively. The mating of the sections 370 and 372 causes the electrical connectors 460, 462 in the sections 370, 372 to engage with one another, and thereby cause the conductors 464 to become interconnected so that electrical power can transfer between the sections 370, 372.

Figure 34:
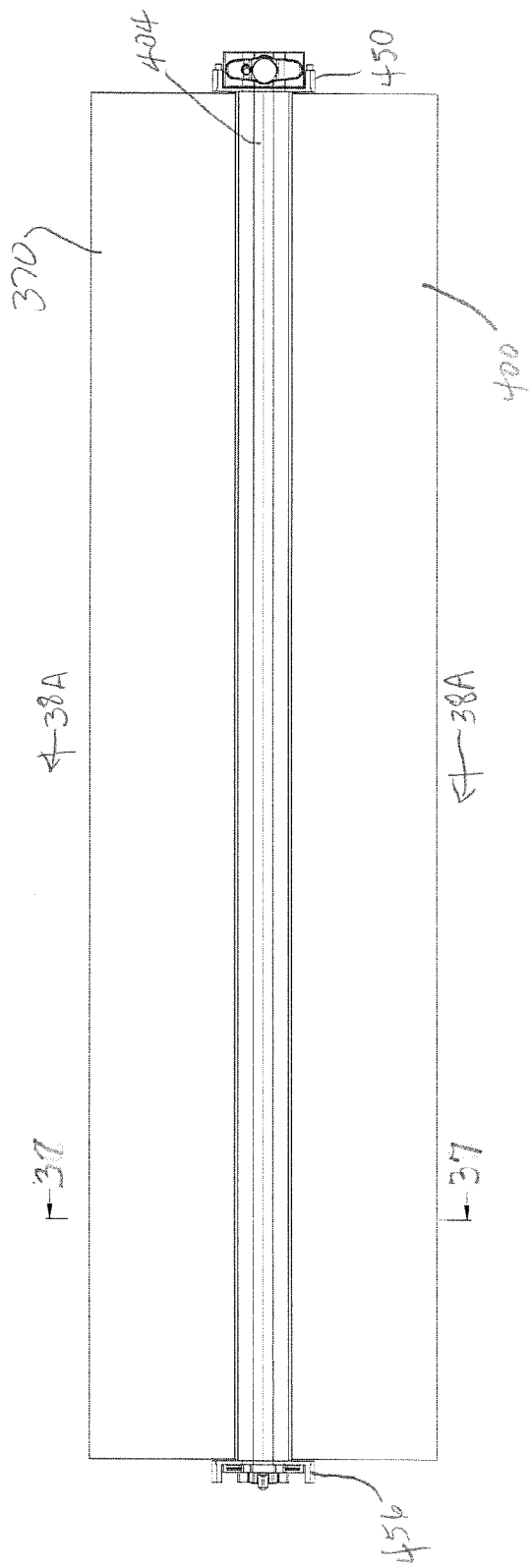
FIG. 34 is a bottom elevation view of one of the luminaire sections of the embodiment of FIG. 31.
Figure 35:
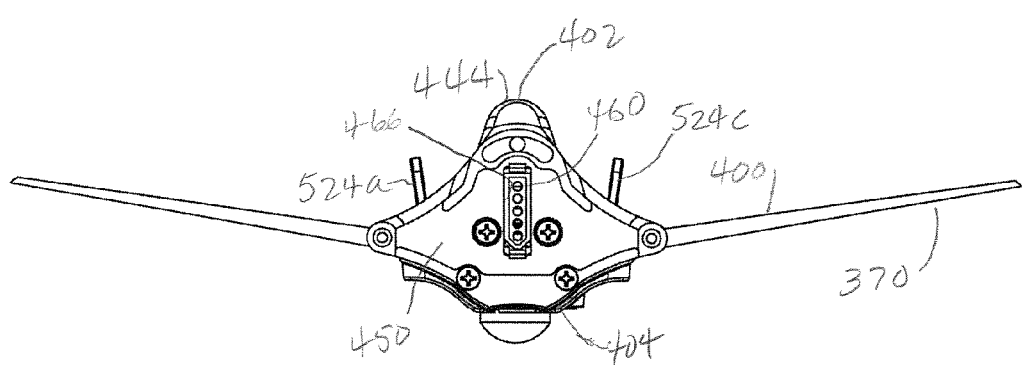
FIG. 35 is a right end view of the luminaire section of FIG. 34 with an end cap omitted therefrom.
Figure 39A:
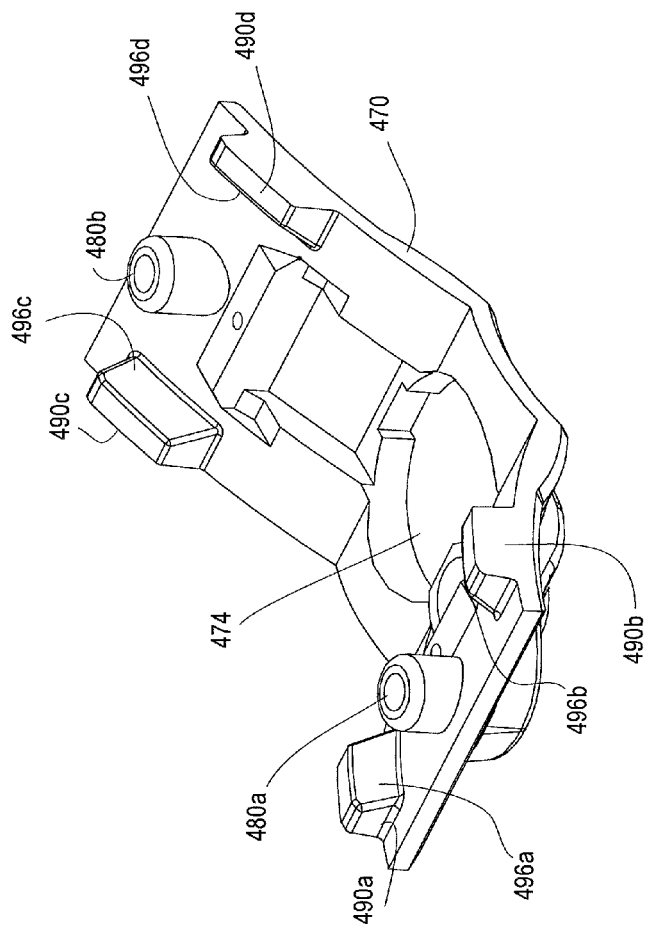
FIG. 39A is an enlarged isometric view of the clamping plate of FIG. 39.

As seen in FIGS. 33, 34 and 39A, tightening the clamping fasteners 475a, 475b after mating of the sections 370, 372 causes upwardly facing projections 490a-490d of the clamping member 470 to move upward as seen in the Figures and enter recesses 492a-492d in lower surfaces 494, 495 of the male and female junction members 450, 456 (the recesses 492c, 492d are not visible, but are mirror images of the recesses 492a, 492b, respectively, and are disposed on either side of the bore 476b). Continued tightening of the clamping fasteners 475a, 475b causes angled surfaces 496a-496d of the projections 490a-490d to engage and slide upwards relative to angled surfaces 497a-497d that define the recesses 492a-492d. The angled surfaces 496a-496d and the angled surfaces 497a-497d are inclined at angles relative to a center line 498 of the clamping member 470 so that tightening of the clamping fasteners 475a, 475b results in placement of the clamping member 470 in tension and placement of the surfaces 482, 484 in compression. Additional surfaces 500, 502 of the male junction member 450 and surfaces 504, 506 of the female junction member 456 (FIGS. 40-42) are also placed in compression as a result of tightening of the clamping fasteners 475a, 475b. The tolerances of the various parts and the degree to which the fasteners 475 can be threaded into the bosses 480 are such that the relative placement of the sections 370 and 372 can be adjusted. For example, tightening of one or both of the fasteners 475a, 475b to particular positions in the bosses 480 may result in substantial horizontal alignment of the sections 370, 372. Tightening to other position in the bosses 480 may result in a horizontal V-shape or horizontal inverted V-shape disposition of the sections 370, 372. Differential tightening of the fasteners 475a, 475b in the bosses 480 may result in a side to side alignment or misalignment of the sections 370, 372. This adjustability permits installation in situations where vertical and side to side section placement must be controlled. Also, the locations of the locating pins 486 and bores 488, the surfaces 482, 484, 500, 502, 504, and 506 are such that substantial resistance against deflection forces in multiple planes is provided. The sections 370, 372 are thereby rigidly locked together in multiple planes, and sagging at such location is minimized, in turn minimizing overall sagging of the luminaire 360.

Referring again to FIGS. 31-33, the power input end cap 390 disposed at the end 362 at least partially encloses the coupling section of the waveguide body and includes a mating electrical connector (not shown) identical to the electrical connector 460 wherein the connector in the cap 390 engages with the electrical connector 462 in the end 370b to receive electrical power via the cord 392. In the illustrated embodiment the further end cap 394 further encloses the coupling section of the waveguide body and is disposed at the end 372a of the section 372 and may include an electrical connector (also not shown) identical to the connector 462 that engages the connector 460 disposed at the end 372a. The electrical connector 512 in the end cap 394 may complete a circuit as required to supply power to the LEDs 420. Alternatively, if electrical connection(s) are not required at the end cap 394, the electrical connector therein may be omitted.

As seen in FIG. 38, the first structural member 402 includes two elongate side slots 520, 522 that are adapted to receive and retain therein mounting apparatus including apertured tabs 524a-524d (FIGS. 31-33, 35, 36, and 39). As seen in FIGS. 31-33, ends of main sections 384a, 386a of the aircraft cables 384, 386 may be secured to tubular members 526, 528 and auxiliary sections 384b, 386b of aircraft cables 384, 386 extend through aligned holes in the walls of the tubular members 526, 528 and are secured to the apertured tabs 524a-524d to mount the luminaire 360.

In the preferred embodiment, each of the sections 370, 372 is 4 feet in length, although each section may be of any other length. Sections of the preferred size are easy to transport, do not noticeably sag, and are readily manufactured and handled. The shapes of the first and second structural members are such that the members do not significantly obstruct emitted light and are light and strong. Strength is further enhanced by the concave shape of the lower portion of the second structural member, which also adds aesthetic appeal and further allows sections to be nested together during shipment. The side slots 520, 522 may serve as a wire routing feature so that wire visibility is minimized. The side slots 520, 522 can also accommodate alternative mounting devices as desired, so that the luminaire 360 can be mounted in other orientations, and/or to other structures.

Preferably, the angled surfaces 496a-496d have a length between about 4.82 mm and about 4.98 mm, and, more preferably between about 4.85 mm and about 4.95 mm. Further, the angled surfaces 496a-496d are disposed at angles between about 29 degrees and about 31 degrees, and, more preferably between about 29.5 degrees and about 30.5 degrees relative to the center line 498. Still further, the angled surfaces 497a-497d preferably have a length between about 2.12 mm and about 2.28 mm, and, more preferably between about 2.15 mm and about 2.25 mm. Further, the angled surfaces 497a-497d are disposed at angles between about 34 degrees and about 36 degrees, and, more preferably between about 34.5 degrees and about 35.5 degrees relative to the center line 498.

The present embodiment has an aspect ratio (i.e., the ratio of luminaire width to height excluding mounting components) of at least about 1.0, and more preferably at least about 2.0, and most preferably about 4.8. Also, the overall width of the mechanical components (excluding mounting components and optical components) as a ratio of the overall width of the luminaire (excluding mounting components) is desirably low, preferably no more than about 30 percent, more preferably no more than about 20 percent, and most preferably about 14.5 percent. Further, much of the light distribution is directed upwardly toward a ceiling, and the large optical component size results in low luminance and, therefore, less objectionable glare. Still further, the illumination of the optical surface of the luminaire is desirably close to the appearance of a ceiling illuminated by the luminaire, when viewed from below. In fact, luminance variations of about 6:1 or less are preferable, with luminance variations of less than about 3:1 being more preferable and luminance variations of less than about 2:1 being most preferable such that extreme observed variations are minimized. In addition, the use of LEDs results in a low power luminaire.

It should be noted that other alternatives are possible. For example, LEDs may be disposed on the bottom of the luminaire, but may not be disposed in a structural member, such as a housing, and the electronics including the power circuit C and/or the light control circuit LC may be disposed above the luminaire within or outside of a structural member, such as in or outside a housing. Alternatively, one or more components of the circuits C and/or LC and/or one or more other components may be disposed in the second structural member (see FIGS. 38, 38A) and one or more LEDs may be disposed in the first structural member (in which case the waveguide body may be inverted), or all of the components of the circuits C, LC and all of the LEDs may be disposed in one of the first and second structural members, in which case the other of the first and second structural members may be omitted. The luminaire may be suspended from a top structural member, such as a top housing, and/or above a bottom structural member, such as a housing, or may be suspended from any other component or structure.

INDUSTRIAL APPLICABILITY

In summary, it has been found that when using a single color or multicolor LED element in a luminaire, it is desirable to mix the light output developed by the LEDs thoroughly so that the intensity and/or color appearance emitted by the luminaire is uniform. When the LED element is used with a waveguide, opportunities have been found to exist to accomplish such mixing during the light coupling and light guiding or distributing functions. Specifically, bending the light rays by refraction can result in improvement in mixing. In such a case, this refractive bending can be accomplished by providing interfaces in the waveguide between materials having different indices of refraction. These interfaces may define coupling features where light developed by the LED elements enters the waveguide and/or light redirection features at portions intermediate the coupling features and waveguide extraction features or areas where light is otherwise extracted (such as by bends) from the waveguide. It has further been found that directing light into a wide range of refraction angles enhances light mixing. Because the angle $A_r$ of a refracted light ray is a function of the angle $A_i$ between the incident light ray and the interface surface struck by the incident light ray (with refractive angle $A_r$ increasing as $A_i$ approaches zero, i.e., when the incident light ray approaches a parallel condition with respect to the interface surface), a wide range of refracted light ray angles can be obtained by configuring the interface surfaces to include a wide range of angles relative to the incident light rays. This, in turn, means that the interfaces could include a significant extent of interface surfaces that are nearly parallel to the incident light rays, as well as other surfaces disposed at other angles to the incident light rays. Overall waveguide shapes and coupling feature and redirection feature shapes such as curved (including convex, concave, and combinations of convex and concave surfaces), planar, non-planar, tapered, segmented, continuous or discontinuous surfaces, regular or irregular shaped surfaces, symmetric or asymmetric shapes, etc. can be used, it being understood that, in general, light mixing (consistent with the necessary control over light extraction) can be further improved by providing an increased number of interface surfaces and/or more complex interface shapes in the light path. Also, the spacing of coupling features and light redirection features affect the degree of mixing. In some embodiments a single light coupling feature and/or a single light redirection feature may be sufficient to accomplish a desired degree of light mixing. In other embodiments, multiple coupling features and/or multiple light redirection features might be used to realize a desired degree of mixing. In either event, the shapes of multiple coupling features or multiple redirection features may be simple or complex, they may be the same shape or of different shapes, they may be equally or unequally spaced, or distributed randomly or in one or more arrays (which may themselves be equally or unequally spaced, the same or different size and/or shape, etc.) Further, the interfaces may be disposed in a symmetric or asymmetric pattern in the waveguide, the waveguide itself may be symmetric or asymmetric, the waveguide may develop a light distribution that is symmetric, asymmetric, centered or non-centered with respect to the waveguide, the light distribution may be on-axis (i.e., normal to a face of the waveguide) or off-axis (i.e., other than normal with respect to the waveguide face), single or split-beam, etc.

Still further, one or more coupling features or redirection features, or both, may be disposed anywhere inside the waveguide, at any outside surface of the waveguide, such as an edge surface or major face of the waveguide, and/or at locations extending over more than one surface or portion of the waveguide. Where a coupling or light redirection feature is disposed inside the waveguide, the feature may be disposed in or be defined by a cavity extending fully through the waveguide or in or by a cavity that does not extend fully through the waveguide (e.g., in a blind bore or in a cavity fully enclosed by the material of the waveguide). Also, the waveguide of any of the embodiments disclosed herein may be planar, non-planar, irregular-shaped, curved, other shapes, suspended, etc.

While specific coupling feature and light redirection feature parameters including shapes, sizes, locations, orientations relative to a light source, materials, etc. are disclosed as embodiments herein, the present invention is not limited to the disclosed embodiments, inasmuch as various combinations and all permutations of such parameters are also specifically contemplated herein. Thus, any one of the coupling cavities, plug members, LED elements, masking element(s), redirection features, extraction features, etc. as described herein may be used in a luminaire, either alone or in combination with one or more additional elements, or in varying combination(s) to obtain light mixing and/or a desired light output distribution. More specifically, any of the features described and/or claimed in U.S. patent application Ser. No. 13/842,521, U.S. patent application Ser. No. 13/839,949, U.S. patent application Ser. No. 13/841,074, filed Mar. 15, 2013, entitled "Optical Waveguide Body", U.S. patent application Ser. No. 13/840,563, U.S. patent application Ser. No. 14/101,086, filed Dec. 9, 2013, entitled "Optical Waveguides and Luminaires Incorporating Same" by Keller et al., U.S. patent application Ser. No. 14/101,099, filed Dec. 9, 2013, entitled "Optical Waveguide Assembly and Light Engine Including Same" by Yuan et al., U.S. patent application Ser. No. 14/101,132, filed Dec. 9, 2013, entitled "Waveguide Bodies Including Redirection Features and Methods of Producing Same" by Tarsa, U.S. patent application Ser. No. 14/101,147, filed Dec. 9, 2013, entitled "Luminaires Using Waveguide Bodies and Optical Elements" by Keller et al., U.S. patent application Ser. No. 14/101,129, filed Dec. 9, 2013, entitled "Simplified Low Profile Module with Light Guide for Pendant, Surface Mount, Wall Mount, and Stand Alone Luminaires" by Tarsa et al., U.S. patent application Ser. No. 14/101,051, filed Dec. 9, 2013, entitled "Optical Waveguide and Lamp Including Same" by Yuan et al. and International Application No. PCT/US14/13931, filed Jan. 30, 2014, entitled "Optical Waveguides and Luminaires Incorporating Same", incorporated by reference herein and owned by the assignee of the present application may be used in the devices disclosed herein. Thus, for example, any of the waveguides or luminaires disclosed herein may include one or more coupling features or optics, a modified LED arrangement, one or more light redirection features, one or more extraction features, and/or particular waveguide or overall luminaire shapes and/or configurations as disclosed in such applications, as necessary or desirable. Other luminaire and waveguide form factors than those disclosed herein are also contemplated.

The coupling features disclosed herein efficiently couple light into the waveguide, and the redirection features uniformly mix light within the waveguide and the light is thus conditioned for uniform extraction out of the waveguide. At least some of the luminaires disclosed herein are particularly adapted for use in installations, such as, replacement or retrofit lamps (e.g., LED PAR bulbs), outdoor products (e.g., streetlights, high-bay lights, canopy lights), and indoor products (e.g., downlights, troffers, a lay-in or drop-in application, a surface mount application onto a wall or ceiling, etc.) preferably requiring a total luminaire output of at least about 800 lumens or greater, and, more preferably, a total luminaire output of at least about 3000 lumens, and most preferably a total lumen output of about 10,000 lumens. Further, the luminaires disclosed herein preferably have a color temperature of between about 2500 degrees Kelvin and about 6200 degrees Kelvin, and more preferably between about 2500 degrees Kelvin and about 5000 degrees Kelvin, and most preferably about 2700 degrees Kelvin. Also, at least some of the luminaires disclosed herein preferably exhibit an efficacy of at least about 100 lumens per watt, and more preferably at least about 120 lumens per watt, and further exhibit a coupling efficiency of at least about 92 percent. Further, at least some of the luminaires disclosed herein preferably exhibit an overall efficiency (i.e., light extracted out of the waveguide divided by light injected into the waveguide) of at least about 85 percent. A color rendition index (CRI) of at least about 80 is preferably attained by at least some of the luminaires disclosed herein, with a CRI of at least about 88 being more preferable. A gamut area index (GAI) of at least about 65 is achievable. Any desired particular output light distribution, such as a butterfly light distribution, could be achieved, including up and down light distributions or up only or down only distributions, etc.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and collimation. This coupling allows the full range of angular emission from the source, including high-angle light, to be re-directed and collimated, resulting in higher optical efficiency in a more compact form factor.

Embodiments disclosed herein are capable of complying with improved operational standards as compared to the prior art as follows:

|  | State-of-the Art Standards | Improved Standards Achievable by Present Embodiments |
| --- | --- | --- |
| Input (coupling + waveguide) | 90% | Almost 95%: improved through color mixing, source mixing, and control within the waveguide. |
| Output (extraction) | 90% | About 95%: improved through extraction efficiency. |
| Total system | ~80% | About 90%: greater control, many choices |

In at least some of the present embodiments, the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through the waveguide to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar reference in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. It should be understood that the illustrated embodiments are exemplary only, and should not be taken as limiting the scope of the disclosure.

We claim:

1. A luminaire comprising:
   an optical element comprising a coupling portion and first and second sections;
   wherein the coupling portion comprises a concave coupling cavity that extends into the coupling portion and along a length of the optical element, and a surface located opposite the coupling cavity;
   wherein a shortest distance between the surface and the coupling cavity is greater than a depth of the coupling cavity into the coupling portion, and the coupling cavity is configured to receive at least one light emitting diode; and
   wherein the first and second sections extend away from the coupling portion of the optical element along the length of the coupling cavity, wherein the first section comprises a first thickness closer to the coupling portion and a second thickness further from the coupling portion, the first thickness is greater than the second thickness, the second section comprises a third thickness closer to the coupling portion and a fourth thickness further from the coupling portion, the third thickness is greater than the fourth thickness, and light is extracted out of extraction features of opposing sides of at least one section.

2. The luminaire of claim 1, wherein the surface of the coupling portion located opposite the coupling cavity comprises first and second coupling surfaces that are configured to direct light onto first and second control surfaces.

3. The luminaire of claim 2, wherein the first and second control surfaces are configured to direct light into at least one of the first and second sections.

4. The luminaire of claim 3, wherein at least one of the first and second control surfaces is configured to direct light as a collimated ray group.

5. The luminaire of claim 2, wherein the first and second control surfaces define a V-shape of the surface.

6. The luminaire of claim 5, wherein the V-shape of the surface is coated with a specular material.

7. The luminaire of claim 1, wherein the extraction features protrude outwardly from the at least one of the first and second sections.

8. The luminaire of claim 1, wherein the light produced from the at least one light emitting diode is reflected from a ceiling in an illuminance per unit area maximum to minimum ratio of about 3:1.

9. The luminaire of claim 1, wherein the light produced from the at least one light emitting diode is reflected from a ceiling in an illuminance maximum to minimum ratio between about 2:1 to 4:1.

10. The luminaire of claim 1, wherein the light produced from the at least one light emitting diode is reflected from a ceiling in an illuminance maximum to minimum ratio of no greater than about 3:1.

11. The luminaire of claim 1, wherein the light produced from the at least one light emitting diode is reflected from a ceiling in an illuminance maximum to minimum ratio of no less than about 2:1.

* * * * *